United States Patent
Tatsumi

(10) Patent No.: US 9,875,524 B2
(45) Date of Patent: Jan. 23, 2018

(54) IMAGE PROCESSING APPARATUS, IMAGE PROCESSING METHOD, AND COMPUTER-READABLE STORAGE MEDIUM

(71) Applicant: CANON KABUSHIKI KAISHA, Tokyo (JP)

(72) Inventor: Eisaku Tatsumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 14/992,436

(22) Filed: Jan. 11, 2016

(65) Prior Publication Data

US 2016/0212348 A1 Jul. 21, 2016

(30) Foreign Application Priority Data

Jan. 16, 2015 (JP) .................. 2015-007192
Aug. 21, 2015 (JP) .................. 2015-164180

(51) Int. Cl.
G06T 3/40 (2006.01)
H04N 5/217 (2011.01)
H04N 9/04 (2006.01)

(52) U.S. Cl.
CPC .......... *G06T 3/4092* (2013.01); *H04N 5/217* (2013.01); *H04N 9/045* (2013.01)

(58) Field of Classification Search
None
See application file for complete search history.

(56) References Cited

U.S. PATENT DOCUMENTS

| 5,091,795 | A | | 2/1992 | Nishioka et al. |
| 5,881,180 | A | * | 3/1999 | Chang ............... H04N 19/86 375/E7.19 |
| 5,978,518 | A | * | 11/1999 | Oliyide ............... G06T 5/007 382/260 |
| 6,018,596 | A | * | 1/2000 | Wilkinson ............ H04N 5/142 348/E5.064 |

(Continued)

FOREIGN PATENT DOCUMENTS

| JP | 02244876 A | 9/1990 |
| JP | 03040179 A | 2/1991 |

(Continued)

*Primary Examiner* — Timothy J Henn
(74) *Attorney, Agent, or Firm* — Rossi, Kimms & McDowell LLP

(57) ABSTRACT

An image processing apparatus includes: an input unit adapted to input an image; a first acquisition unit adapted to acquire a low-frequency component image from the image input by the input unit; a first transformation unit adapted to transform the low-frequency component image acquired by the first acquisition unit; a second transformation unit adapted to transform the image input by the input unit; a second acquisition unit adapted to acquire a transformed high-frequency component image from the transformed image obtained by the second transformation unit; and a display control unit adapted to display, on a display unit, a combined image obtained by combining the transformed low-frequency component image obtained by the first transformation unit and the transformed high-frequency component image acquired by the second acquisition unit.

11 Claims, 15 Drawing Sheets

(56) References Cited

U.S. PATENT DOCUMENTS

| | | | | |
|---|---|---|---|---|
| 6,069,979 | A | * | 5/2000 | VanMetter ............ G06T 5/009 382/130 |
| 6,281,933 | B1 | * | 8/2001 | Ritter .................... G06T 3/40 348/446 |
| 8,511,835 | B2 | | 8/2013 | Sato |
| 2004/0028271 | A1 | * | 2/2004 | Pollard .................. H04N 1/58 382/162 |
| 2006/0221249 | A1 | * | 10/2006 | Lin ........................ G06K 9/40 348/607 |
| 2007/0171310 | A1 | * | 7/2007 | Arici ..................... H04N 5/20 348/687 |
| 2007/0229710 | A1 | * | 10/2007 | Park ..................... H04N 19/86 348/618 |
| 2009/0040374 | A1 | * | 2/2009 | Kobayashi ............. G09G 3/20 348/448 |
| 2009/0109233 | A1 | * | 4/2009 | Kerofsky ............. G09G 3/2003 345/589 |
| 2013/0034307 | A1 | * | 2/2013 | Jerdev .................. G06T 5/009 382/232 |
| 2014/0240555 | A1 | * | 8/2014 | Fainstain .............. H04N 5/217 348/241 |

FOREIGN PATENT DOCUMENTS

| | | |
|---|---|---|
| JP | 2556831 B2 | 11/1996 |
| JP | 2003050398 A | 2/2003 |
| JP | 2006080845 A | 3/2006 |
| JP | 2012060517 A | 3/2012 |

* cited by examiner

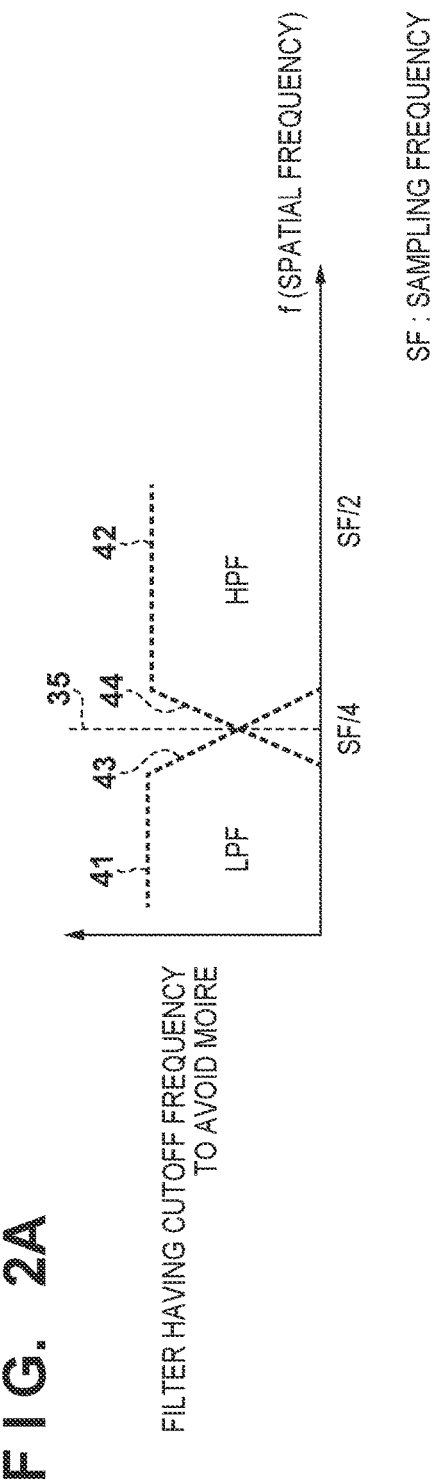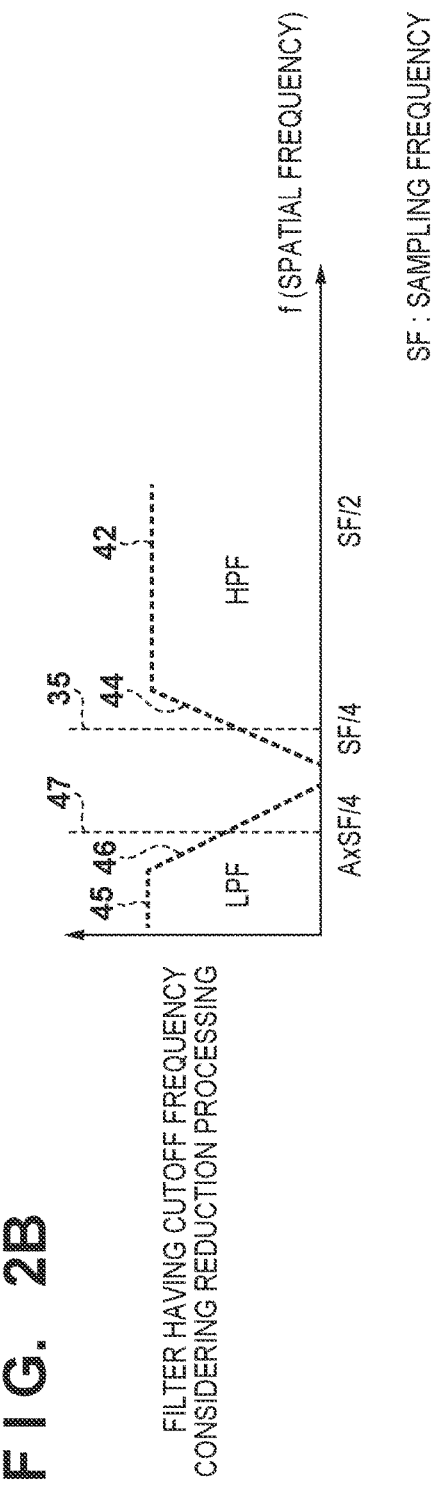

FIG. 6A

RADIUS 2
GAUSSIAN FILTER
3×3

| 1 | 2 | 1 |
|---|---|---|
| 2 | 4 | 2 |
| 1 | 2 | 1 |

SUM/16

FIG. 6B

RADIUS 1.5
GAUSSIAN FILTER
3×3

| 0.5 | 1 | 0.5 |
|---|---|---|
| 1 | 2 | 1 |
| 0.5 | 1 | 0.5 |

SUM/8

FIG. 6C

RADIUS 4
GAUSSIAN FILTER
5×5

| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

SUM/256

FIG. 7A

HPF
2×2

| −0.25 | −0.5 | −0.25 |
|---|---|---|
| −0.5 | 3 | −0.5 |
| −0.25 | −0.5 | −0.25 |

SUM/3 OR SUM × 85/256

FIG. 7B

HPF
1.5×1.5

|  | −0.25 |  |
|---|---|---|
| −0.25 | 1 | −0.25 |
|  | −0.25 |  |

SUM/1

FIG. 7C

HPF
3×3

| −1 | −1 | −1 |
|---|---|---|
| −1 | 8 | −1 |
| −1 | −1 | −1 |

SUM/8

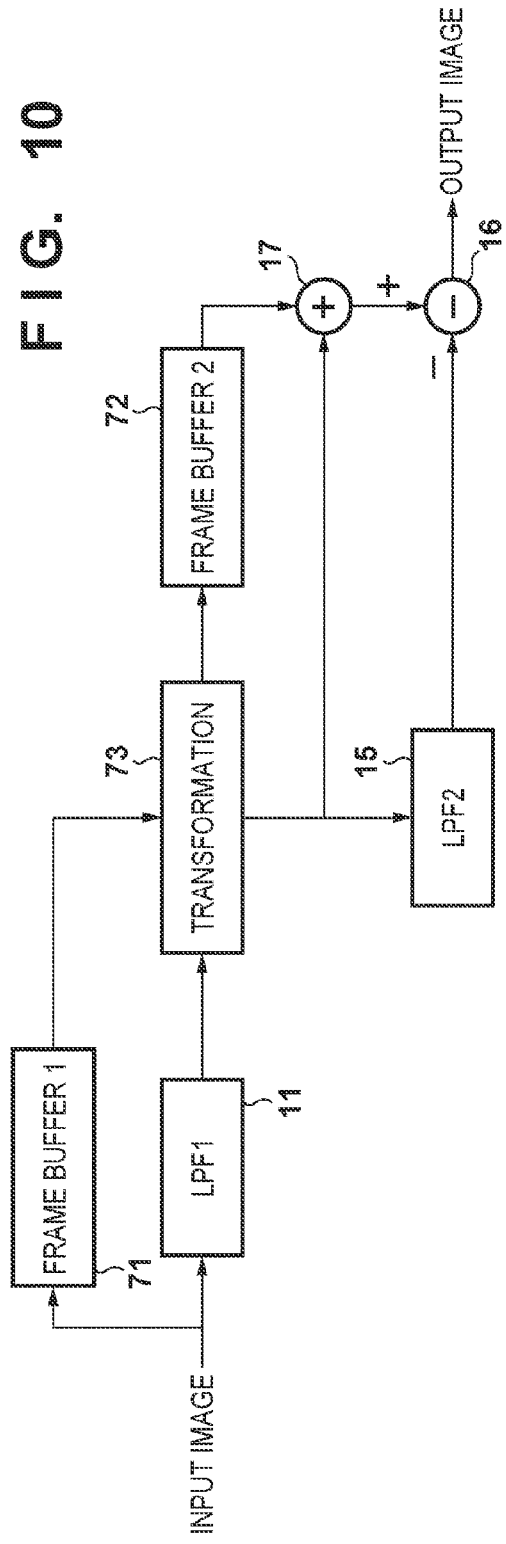
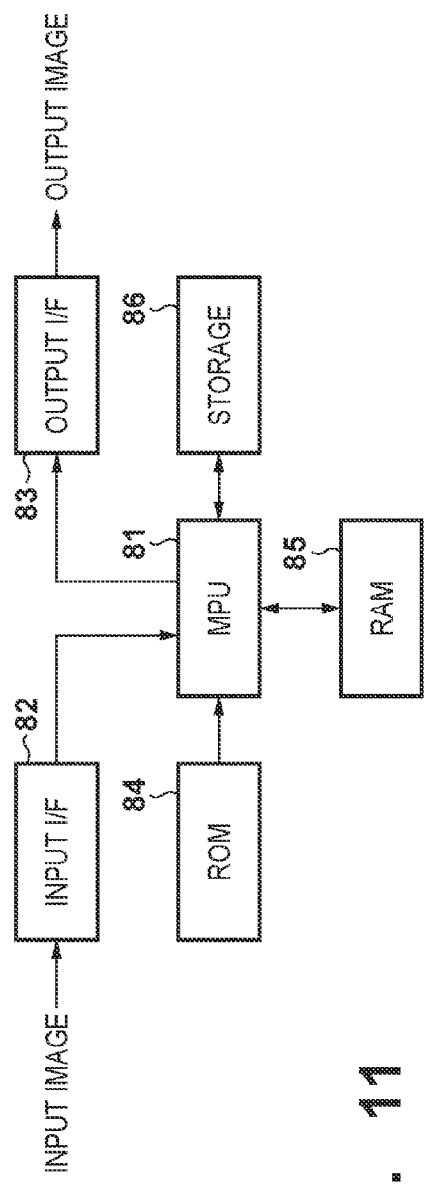

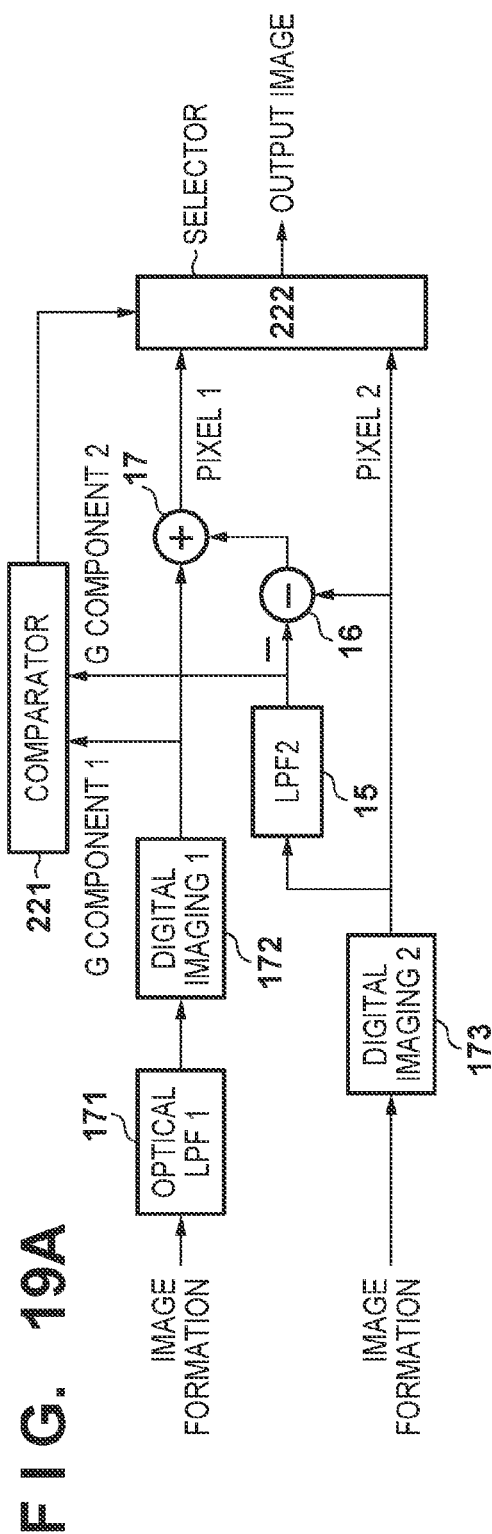
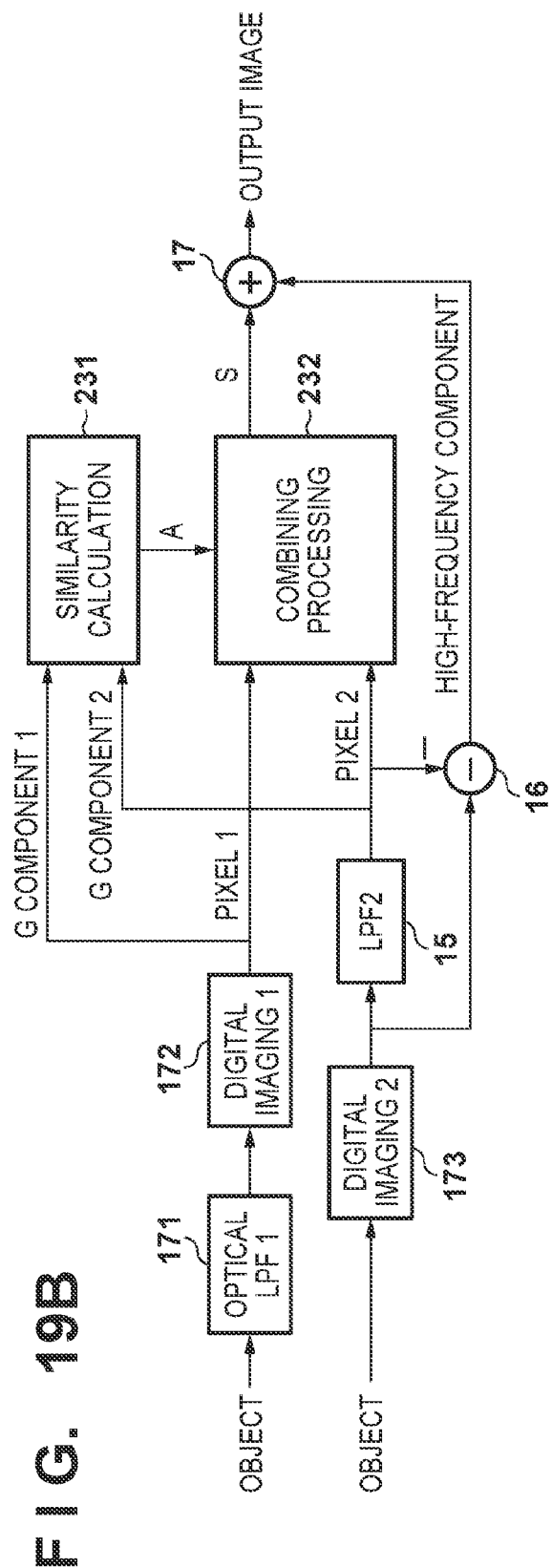
FIG. 19A
FIG. 19B

IMAGE PROCESSING APPARATUS, IMAGE PROCESSING METHOD, AND COMPUTER-READABLE STORAGE MEDIUM

BACKGROUND OF THE INVENTION

Field of the Invention

The present invention relates to an image processing apparatus, an image processing method, and a computer-readable storage medium.

Description of the Related Art

Conventionally known is changing a resolution between an input image and an output image. For example, image conversion processing called reduction processing or enlargement processing is known to be performed to obtain a recording resolution different from an image capturing resolution or display a broadcast moving image signal on a display device whose resolution is different from the resolution of the signal. In addition, image conversion processing called geometric transformation processing is known to be performed to allow a projector to project an image from an oblique direction or onto a curved screen. In a digital camera, a digital video camera, a flatbed scanner, or the like, conventionally, an optically formed image of an object is converted into a digital image by a digital image sensor. These image conversion processes will generically be referred to as conversion processing hereinafter.

When performing image transformation processing out of the conversion processes, a disturbance (noise) called a moiré sometimes occurs depending on the contents of an image. The moiré, which is also called interference fringes, is a beat phenomenon of a spatial frequency that occurs between a sampling frequency and a repetitive pattern in an image. The moiré is very noticeable and needs to be prevented to maintain image quality. When performing digital imaging processing out of the conversion processes as well, a moiré may occur depending on the contents of an object, and the moiré needs to be prevented. If the RGB elements of the digital image sensor have an arrangement called a Bayer arrangement, not only a moiré but also a disturbance called a false color may occur, and the false color also needs to be prevented.

For example, in reduction processing including geometric transformation processing, a moiré is known to be prevented by decreasing a high-frequency region using a low-pass filter (to be abbreviated as an LPF hereinafter) applied to an input image and then performing reduction processing including geometric transformation processing. Since the image is blurred by this processing, high-frequency region enhancement processing is sometimes performed at the subsequent stage. In addition, for example, a moiré and false colors are known to be prevented by decreasing the high-frequency region of an object using an optical LPF arranged in front of an image sensor and then performing digital imaging.

To prevent a moiré or blur, Japanese Patent Laid-Open No. 3-40179 describes enhancing the high-frequency region of an input image in advance and removing a moiré generated after reduction processing. In this arrangement, the high-frequency region degrades little. Japanese Patent Laid-Open No. 2012-60517 describes changing the intensity of an LPF in accordance with an image reduction ratio. In this arrangement, high-frequency components of an image which exceed the Nyquist frequency upon reduction processing are removed by the LPF, thereby preventing a moiré. Japanese Patent Laid-Open No. 2-244876 describes divisionally transforming low-frequency components and high-frequency components of an image and performing edge enhancement only for the high-frequency components to prevent a blur caused by reduction. According to this arrangement, the blur of the high-frequency components caused by reduction can be prevented to some extent. Japanese Patent Laid-Open No. 2006-80845 describes combining a plurality of images obtained by performing digital imaging processing a plurality of times while changing the characteristic of an optical LPF such that portions with a moiré or false color are replaced. This can prevent a moiré or false color.

When transformation processing is performed for an image that has passed through a low-pass filter, and high-frequency enhancement processing is then performed, the lost information of the high-frequency region cannot be restored by the enhancement. Hence, the image quality degrades.

When enhancing the high-frequency region of an input image in advance and removing a moiré after reduction processing, as in the arrangement of Japanese Patent Laid-Open No. 3-40179, a low-pass filter such as a moving filter is applied to a moiré frequency to remove the moiré. In this case, image components of the same frequency as the moiré frequency decrease, and the image quality of low-frequency components degrades.

In the arrangement of Japanese Patent Laid-Open No. 2012-60517, high-frequency components of an image which exceed the Nyquist frequency upon reduction processing are removed. This method can effectively be used to remove a moiré generated by the high-frequency components higher than the Nyquist frequency but is not necessarily effective in a case in which an image is enlarged or in a case in which a moiré is generated by interference between a sampling frequency and a fringe pattern in an image at the time of image reduction. In addition, a blur remains in a portion where the image reduction ratio is high.

When divisionally transforming low-frequency components and high-frequency components of an image and performing edge enhancement only for the high-frequency components to prevent, as in the arrangement of Japanese Patent Laid-Open No. 2-244876, a moiré generated in the high-frequency components remains even after the edge enhancement. For this reason, a moiré occurs in the output image. Assume that two images of different intensities are obtained by changing the characteristic of an optical LPF and combined using the image of the weak optical LPF as a seed such that only portions with a moiré or false color are replaced with the image of the strong optical LPF, as in Japanese Patent Laid-Open No. 2006-80845. In this case, the image has neither a moiré nor a false color but has a blur in the replaced portions.

SUMMARY OF THE INVENTION

The present invention has been made in consideration of the above-described problems, and provides a technique of reducing a moiré and a blur caused by transformation processing for an input image.

According to one aspect of the present invention, an image processing apparatus includes: an input unit adapted to input an image; a first acquisition unit adapted to acquire a low-frequency component image from the image input by the input unit; a first transformation unit adapted to transform the low-frequency component image acquired by the first acquisition unit; a second transformation unit adapted to transform the image input by the input unit; a second acquisition unit adapted to acquire a transformed high-frequency component image from the transformed image obtained by the second transformation unit; and a display control unit adapted to display, on a display unit, a combined image obtained by combining the transformed low-frequency component image obtained by the first transformation unit and the transformed high-frequency component image acquired by the second acquisition unit.

According to another aspect of the present invention, an image processing apparatus includes: an input unit adapted to input an image; a first acquisition unit adapted to acquire a low-frequency component image from the image input by the input unit; a processing unit adapted to execute registration correction processing for the image input by the input unit; a second acquisition unit adapted to acquire a corrected high-frequency component image from the corrected image that has undergone the registration correction processing executed by the processing unit; and a display control unit adapted to display, on a display unit, a combined image obtained by combining the low-frequency component image acquired by the first acquisition unit and the corrected high-frequency component image acquired by the second acquisition unit.

According to still another aspect of the present invention, an image processing method of an image processing apparatus, includes: causing an input unit to input an image; causing a first acquisition unit to acquire a low-frequency component image from the image input by the input unit; causing a first transformation unit to transform the low-frequency component image acquired by the first acquisition unit; causing a second transformation unit to transform the image input by the input unit; causing a second acquisition unit to acquire a transformed high-frequency component image from the transformed image obtained by the second transformation unit; and causing a display control unit to display, on a display unit, a combined image obtained by combining the transformed low-frequency component image obtained by the first transformation unit and the transformed high-frequency component image acquired by the second acquisition unit.

According to yet another aspect of the present invention, an image processing method of an image processing apparatus, includes: causing an input unit to input an image; causing a first acquisition unit to acquire a low-frequency component image from the image input by the input unit; causing a processing unit to execute registration correction processing for the image input by the input unit; causing a second acquisition unit to acquire a corrected high-frequency component image from the corrected image that has undergone the registration correction processing executed by the processing unit; and causing a display control unit to display, on a display unit, a combined image obtained by combining the low-frequency component image acquired by the first acquisition unit and the corrected high-frequency component image acquired by the second acquisition unit.

According to still yet another aspect of the present invention, a non-transitory computer-readable storage medium storing a computer program for causing a computer to function as each unit of an image processing apparatus includes: an input unit adapted to input an image; a first acquisition unit adapted to acquire a low-frequency component image from the image input by the input unit; a first transformation unit adapted to transform the low-frequency component image acquired by the first acquisition unit; a second transformation unit adapted to transform the image input by the input unit; a second acquisition unit adapted to acquire a transformed high-frequency component image from the transformed image obtained by the second transformation unit; and a display control unit adapted to display, on a display unit, a combined image obtained by combining the transformed low-frequency component image obtained by the first transformation unit and the transformed high-frequency component image acquired by the second acquisition unit.

According to yet still another aspect of the present invention, a non-transitory computer-readable storage medium storing a computer program for causing a computer to function as each unit of an image processing apparatus includes: an input unit adapted to input an image; a first acquisition unit adapted to acquire a low-frequency component image from the image input by the input unit; a processing unit adapted to execute registration correction processing for the image input by the input unit; a second acquisition unit adapted to acquire a corrected high-frequency component image from the corrected image that has undergone the registration correction processing executed by the processing unit; and a display control unit adapted to display, on a display unit, a combined image obtained by combining the low-frequency component image acquired by the first acquisition unit and the corrected high-frequency component image acquired by the second acquisition unit.

Further features of the present invention will become apparent from the following description of exemplary embodiments (with reference to the attached drawings).

BRIEF DESCRIPTION OF THE DRAWINGS

FIGS. 2A and 2B are graphs for explaining the frequency characteristics of an LPF and an HPF;

FIGS. 6A, 6B, and 6C are views showing examples in which an LPF is implemented by a Gaussian filter;

FIGS. 7A, 7B, and 7C are views showing arrangement examples of an HPF;

FIG. 10 is a block diagram showing the arrangement of an image processing apparatus;

FIG. 11 is a block diagram showing the arrangement of an image processing apparatus using a microprocessor;

FIGS. 19A and 19B are block diagrams each showing the arrangement of an image processing apparatus;

DESCRIPTION OF THE EMBODIMENTS

The embodiments of the present invention will now be described in detail with reference to the accompanying drawings.

(Occurrence and Suppression of Moiré)

Figure 1A:
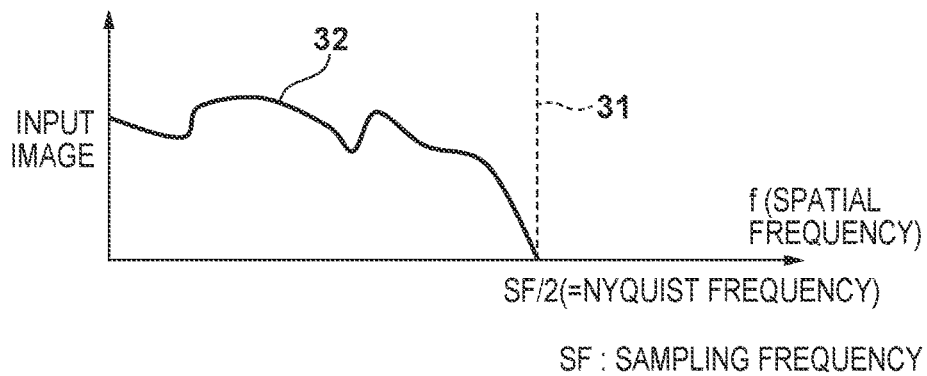
FIGS. 1A, 1B, and 1C are graphs showing the relationship between a moiré and a spatial frequency of an image.
Figure 1B:
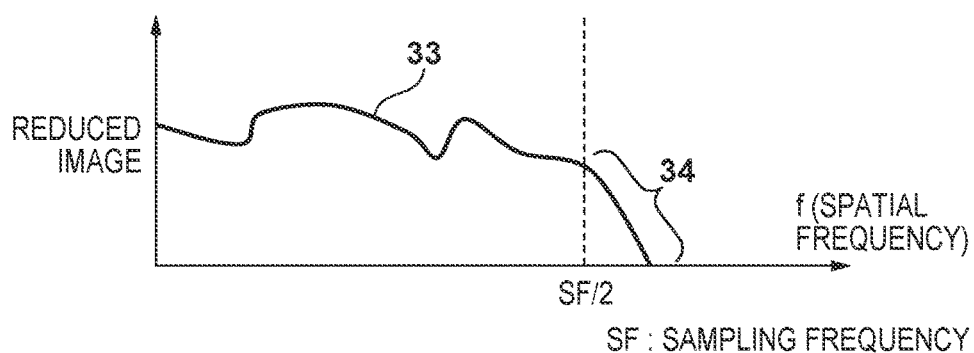
Figure 1C:
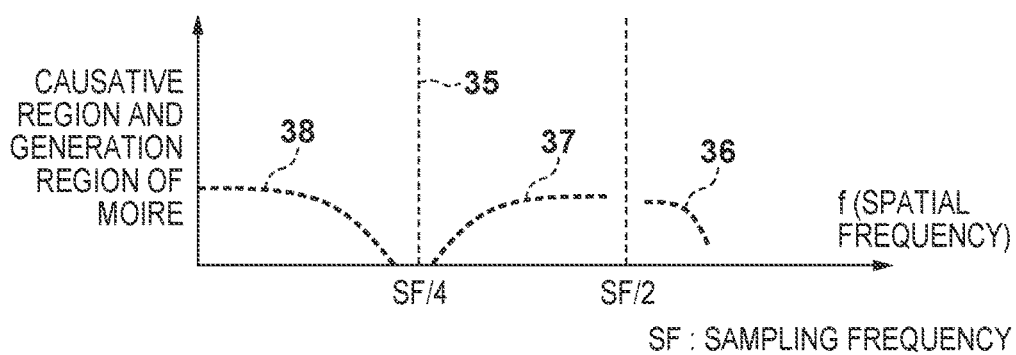

The relationship between a sampling frequency and a spatial frequency that causes a moiré will be described first with reference to FIGS. 1A, 1B, 1C, 2A, and 2B. FIGS. 1A, 1B, and 1C are views schematically showing the relationship between a moiré and a spatial frequency of an image. FIG. 1A is a graph showing the distribution of spatial frequencies in an original image (input image). FIG. 1B is a graph showing the distribution of spatial frequencies in a reduced image. FIG. 1C is a graph showing the distribution of spatial frequencies that cause a moiré in a reduced image and the spatial frequencies of the generated moiré.

The abscissa of each graph represents a spatial frequency, and the ordinate represents a frequency in an image, that is, the intensity of a frequency component in an image. Note that in FIGS. 1A, 1B, and 1C, the sampling frequency is abbreviated as "SF" (Sampling Frequency).

Referring to FIGS. 1A, 1B, and 1C, reference numeral 31 denotes a position of a spatial frequency (SF/2) ½ the sampling frequency, which matches the Nyquist frequency; 32, a frequency distribution in an input image; 33, a frequency distribution in a reduced image obtained by reducing the input image; and 34, a frequency distribution in a portion where the frequency exceeds the Nyquist frequency. Reference numeral 35 denotes a position of a spatial frequency (SF/4) ¼ the sampling frequency; 36, a frequency component that causes a moiré because it exceeds the Nyquist frequency; 37, a frequency component that causes a moiré because of the interference between the image and the sampling frequency; and 38, a frequency component that causes a moiré.

The spatial frequency 32 of the input image shown in FIG. 1A is limited to the position 31 of SF/2 of pixels by the Nyquist theorem (sampling theorem). According to the Nyquist theorem, the original signal can correctly be restored from digitized data by sampling at a frequency twice higher than the original signal. Only a signal up to the frequency SF/2 can correctly be restored from a digitized signal.

When this input image is reduced, the spatial frequency 33 of the image rises with respect to the SF. At this time, a moiré occurs when the spatial frequency 33 of the image has the frequency distribution 34 in a frequency beyond the position 31 of SF/2. Even if there is no frequency component higher than SF/2, a moiré may be caused by the interference between the portion of high-frequency components and the portion of frequency components equal to or lower than SF/2 in the image.

FIG. 1C shows this state from the viewpoint of spatial frequency. A moiré occurs in the portion 38 of low-frequency components equal to or lower than SF/4 (35) due to the frequency components 36 higher than SF/2 and the image components of spatial frequencies 37 from SF/4 (35) to SF/2. That is, the low-frequency component 38 equal to or lower than SF/4 itself is not the cause of a moiré. The frequency components 36 and 37 higher than SF/4 cause a moiré in the low-frequency components 38. In the embodiment of the present invention, a moiré is removed without causing a blur using the fact that the causative portion (frequency components 36 and 37) and the result portion (frequency component 38) of spatial frequencies in which a moiré occurs are different.

FIGS. 2A and 2B are graphs for explaining the frequency characteristics of an LPF and a high-pass filter (to be abbreviated as an HPF) used in the embodiment of the present invention. FIG. 2A shows a case in which the reduction ratio of an image is not so high (the reduction ratio is close to 1). FIG. 2B shows a case in which the reduction ratio is high (the reduction ratio is much higher than 1). In the graphs shown in FIGS. 2A and 2B, the abscissa represents a spatial frequency, and the ordinate represents a frequency in an image. In FIGS. 2A and 2B, the sampling frequency is abbreviated as SF, as in FIGS. 1A, 1B, and 1C. In FIG. 2A, reference numeral 35 denotes the position of SF/4, as in FIGS. 1A, 1B, and 1C. Reference numeral 41 denotes a frequency characteristic of an LPF; 42, a frequency characteristic of an HPF; 43, a cutoff frequency of the LPF; and 44, a cutoff frequency of the HPF.

As described with reference to FIG. 1C, frequency components equal to or lower than SF/4 correspond to a portion where a moiré is caused by transformation processing but not the causative portion of the moiré. The moiré is caused by frequency components equal to or higher than SF/4. For this reason, when the input image is processed using the LPF having the frequency characteristic 41 with the cutoff frequency 43 near SF/4, the causative portion of the moiré is removed. Hence, no moiré occurs even when transformation such as reduction is performed after that. On the other hand, high-frequency components are lost, and a blur occurs in the image.

In addition, frequency components equal to or higher than SF/4 correspond to the causative portion of the moiré but are not a portion where a moiré occurs. For this reason, when an image in which a moiré is caused by transformation such as reduction performed for the input image is processed using the HPF having the frequency characteristic 42 with the cutoff frequency 44 near the frequency ¼ the SF, the moiré is removed. On the other hand, low-frequency components are lost.

In this embodiment, the order of performing processing of dividing frequencies and processing of transforming an image is reversed between a portion where the spatial frequency is high and a portion where the spatial frequency is low, thereby simultaneously avoiding occurrence of a moiré and a blur. That is, the low-frequency component of a transformed image and the high-frequency component of the transformed image are calculated, and the two images are combined, thereby acquiring a transformed image including all frequencies. Since the two images have no moiré, no moiré occurs in the combined image either. If the cutoff frequencies of the two images equal, no frequency component is lost or enhanced. In addition, since the acquired image includes a high-frequency component as well, no blur occurs in the image.

However, if the transformation ratio becomes high, it may be impossible to appropriately remove the moiré, or some frequency components of the combined image may be lost or enhanced unless the cutoff frequency is adjusted between the LPF and the HPF before and after the transformation. Concerning this, the spatial frequencies of filters in a case in which the transformation ratio is high will be described with reference to FIG. 2B. In FIG. 2B, reference numeral 35 denotes SF/4; 42, the frequency characteristic of the HPF; and 44, the cutoff frequency of the HPF, as in FIG. 2A. Reference numeral 45 denotes a frequency characteristic of an LPF; 46, a cutoff frequency of the LPF; and 47, a position (A×SF/4) of a frequency obtained by multiplying a reduction ratio A by ¼ the SF.

The spatial frequency of an image rises upon reduction, as described with reference to FIG. 1B. When the image is reduced, the spatial frequency rises by the reciprocal (1/A) of the reduction ratio A. For example, when the reduction ratio is 0.6, the spatial frequency of the image rises to 1.67 times. When the cutoff frequency of the LPF is lowered to cutoff frequency=A×SF/4 in accordance with the reduction ratio, the spatial frequency of the image that has passed through the LPF rises to 1/A times and becomes SF/4 after reduction. This matches the cutoff frequency of the HPF.

As described above, in a case in which the reduction ratio is high, the cutoff frequencies of the LPF and the HPF are thus adjusted, thereby removing a moiré and preventing any frequency component from being lost or enhanced. According to the above-described principle, reduction, enlargement, or geometric transformation can be performed while removing a moiré without causing a blur. Detailed embodiments of image processing based on this principle will be described below.

(Image Processing Apparatus)

Figure 3:
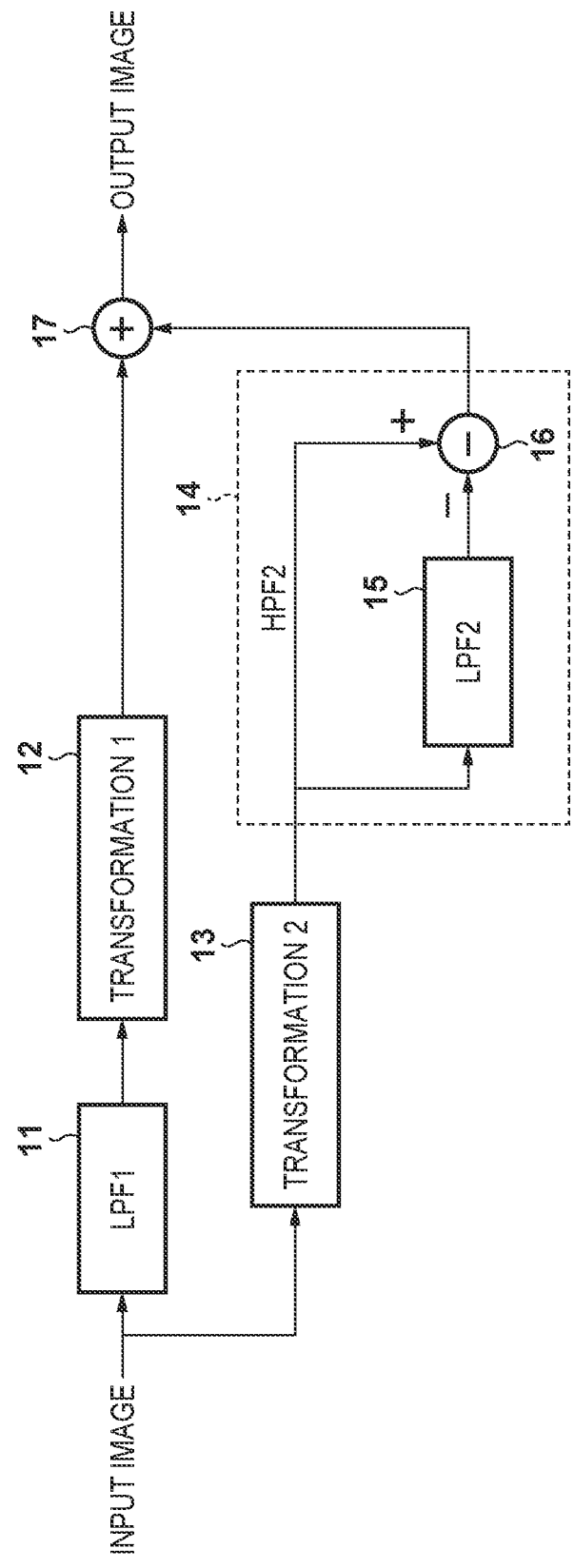
FIG. 3 is a block diagram showing the arrangement of an image processing apparatus.

An embodiment of the present invention will be described next with reference to FIGS. 3 to 7. FIG. 3 is a block diagram showing the functional arrangement of an image processing apparatus according to an embodiment of the present invention. In FIG. 3, a first LPF unit 11 removes a high-frequency component of an input signal. A first transformation unit 12 performs reduction, enlargement, or geometric transformation. A second transformation unit 13 performs reduction, enlargement, or geometric transformation. An HPF unit 14 removes a low-frequency component of the input signal. A second LPF unit 15 constitutes part of the HPF unit 14. A subtracter 16 constitutes part of the HPF unit 14. An adder 17 adds the low-frequency component image transformed by the first transformation unit 12 and the transformed image from which the high-frequency component is extracted by the HPF unit 14, thereby generating an output image.

As shown in FIG. 3, in this embodiment, as for the low-frequency component of the input image, the first LPF unit 11 extracts the low-frequency component, and the first transformation unit 12 transforms it. It is therefore possible to suppress a moiré caused by the influence of the high-frequency component of the input image on the low-frequency component. In addition, the second transformation unit 13 transforms the input image, the HPF unit 14 extracts the high-frequency component image, and the adder 17 adds the transformed low-frequency component and the high-frequency component. Since the high-frequency component of the image is also reflected on the output image, a blur in the image can be suppressed. In addition, the high-frequency component image is extracted from the transformed image to remove the moiré generated in the low-frequency component, and after that, the images are added. This can prevent a moiré from occurring in the low-frequency component. It is therefore possible to perform image processing while simultaneously suppressing a moiré and attaining sharpness of an image.

The HPF unit 14 may simply be formed using a normal HPF. However, when the HPF unit 14 is formed by combining the second LPF unit 15 and the subtracter 16, matching to the frequency characteristic of the first LPF unit 11 can readily be attained. That is, LPFs having the same arrangement are used as the first LPF unit 11 and the second LPF unit 15, the cutoff frequency (first cutoff frequency) of the first LPF unit 11 and the cutoff frequency (second cutoff frequency) of the HPF unit 14 can easily be made to match. For this reason, in the image after addition by the adder 17, repeat of the same frequency component or omission of a specific frequency can be reduced. In this embodiment, an arrangement example in which the HPF unit 14 is implemented by combining the second LPF unit 15 and the subtracter 16 will be described.

Note that the first LPF unit 11 and the second LPF unit 15 can be formed using various LPFs used in general. Examples are an averaging filter, a Gaussian filter, and a Butterworth filter. As an averaging filter whose cutoff frequency as an LPF is close to ¼ the sampling frequency, a filter whose vertical×horizontal size is 1.25×1.25 to 5×5, for example, 2×2 can be used. Note that a filter of a size using a decimal point can be implemented by decreasing the constant at the coordinate position of the decimal point. As a Gaussian filter, a filter having a filter radius of 1.5 to 6, for example, a radius of 2 can be used. As a Butterworth filter, for example, a filter whose filter constant corresponds to a cutoff frequency that is ¼ the sampling frequency can be used.

The first transformation unit 12 and the second transformation unit 13 can be formed using various interpolation calculation circuits used in general. Examples are a nearest-neighbor interpolation circuit, a linear interpolation circuit, and a cubic interpolation circuit. The first transformation unit 12 and the second transformation unit 13 perform transformation processing such as reduction, enlargement, or geometric transformation at the same transformation ratio.

The type of detailed arrangement may be changed between the first transformation unit and the second transformation unit as long as the transformation ratio is the same. For example, the first transformation unit 12 can be a nearest-neighbor interpolation circuit or a linear interpolation circuit, and the second transformation unit 13 can be a cubic interpolation circuit. In this case, a low-frequency component that is hard to visually recognize is implemented by the nearest-neighbor interpolation circuit or linear interpolation circuit having a small circuit scale, and a high-frequency component that is easy to visually recognize is implemented by the cubic interpolation circuit of high accuracy. Hence, image processing according to a visual characteristic can be performed in a small circuit scale. The circuit scale can further be reduced by forming the first transformation unit 12 using a nearest-neighbor interpolation circuit and forming the second transformation unit 13 using a linear interpolation circuit. When implemented not by a nearest-neighbor interpolation circuit but by a circuit that interpolates by the average value of four neighboring points, the first transformation unit 12 can be formed as a more simple circuit.

Note that when image transformation is performed by the first transformation unit 12 and the second transformation unit 13, the timing of processing changes on a pixel basis between the input and the output of each transformation unit. Hence, a buffer memory needs to be prepared in each of the first transformation unit 12 and the second transformation unit 13, though not illustrated in FIG. 3. Each of the first LPF unit 11 and the second LPF unit 15 also needs to incorporate a buffer memory, though not illustrated.

(Operation of Image Processing Apparatus)

The operation of the image processing apparatus according to this embodiment will be described below. A case in which the input image is a moving image, and pixels in a frame are sequentially input to the constituent block will be explained. The first LPF unit 11 extracts only low-frequency components equal to or lower than the cutoff frequency from the input image. Next, the first transformation unit 12 transforms the image into an image of a desired transformation ratio, thereby obtaining a first transformed image.

The input image is also input to the second transformation unit 13 and transformed into an image of a desired transformation ratio, and a second transformed image is obtained. The second transformed image is input to the second LPF unit 15 and the positive side of the subtracter 16. The second LPF unit 15 extracts the low-frequency components of the second transformed image and inputs them to the negative side of the subtracter 16. The subtracter 16 subtracts the low-frequency components from the second transformed image, thereby obtaining only the high-frequency components of the second transformed image.

When the first transformed image including only the low-frequency components and the high-frequency components of the second transformed image, which are obtained in the above-described way, are combined by the adder 17, an output image that is a transformed image including all frequency components is obtained.

If the transformation ratio is low, circuits of the same characteristic can be used as the first LPF unit 11 and the second LPF unit 15. More specifically, they can use the same circuit when the transformation ratio is about 0.75 to 1.25. For a portion where the reduction ratio, enlargement ratio, or geometric transformation ratio is high, the cutoff frequency or the filter size proportional to the cutoff frequency of one of the first LPF unit 11 and the second LPF unit 15 needs to be adjusted.

(Relationship in Characteristic Between LPFs)

Figure 4:
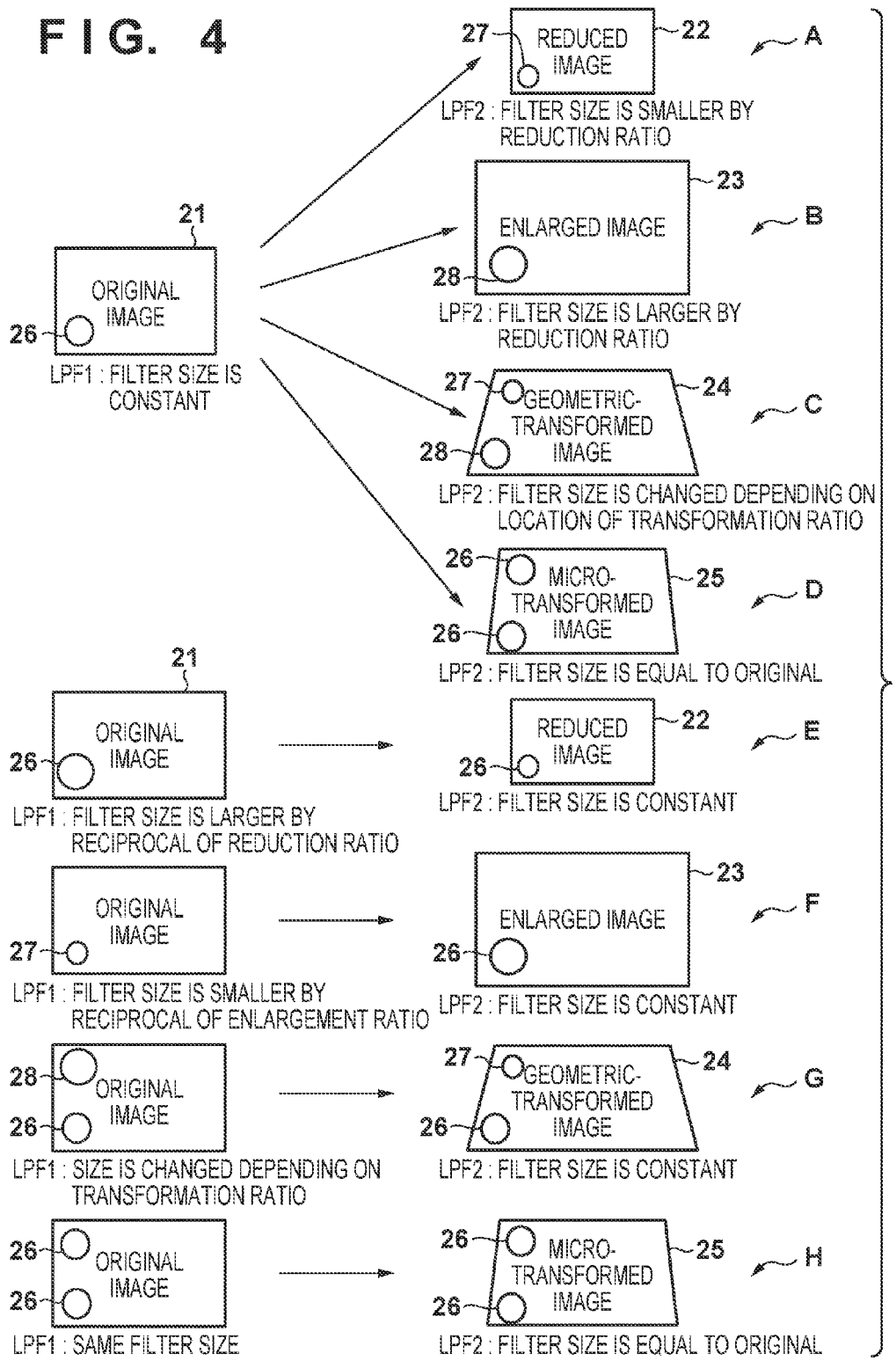
FIG. 4 is a view showing the relationship in the characteristic between an LPF for an original image and an LPF for a transformed image.

The relationship in the characteristic between the first LPF unit 11 and the second LPF unit 15 will be described next with reference to FIG. 4. FIG. 4 is a view showing the relationship in the characteristic between the first LPF unit 11 applied to an original image and the second LPF unit 15 applied to the transformed image according to the embodiment of the present invention.

A, B, C, and D of FIG. 4 show cases in which the characteristic of the first LPF unit 11 applied to an original image is constant, and the characteristic of the second LPF unit 15 is changed for various kinds of transformation in the first transformation unit 12 and the second transformation unit 13. That is, A of FIG. 4 shows a case in which the characteristic of the second LPF unit 15 to be applied to a reduced image is changed. B of FIG. 4 shows a case in which the characteristic of the second LPF unit 15 to be applied to an enlarged image is changed. C of FIG. 4 shows a case in which the characteristic of the second LPF unit 15 to be applied to a geometric-transformed image is changed. D of FIG. 4 shows a case in which the characteristic of the second LPF unit 15 to be applied to a micro-transformed image is changed.

E, F, G, and H of FIG. 4 show cases in which the characteristic of the second LPF unit 15 applied to a transformed image is constant, and the characteristic of the first LPF unit 11 is changed for various kinds of transformation in the first transformation unit 12 and the second transformation unit 13. That is, E of FIG. 4 shows a case in which the characteristic of the first LPF unit 11 to be applied to the original image before reduction is changed. F of FIG. 4 shows a case in which the characteristic of the first LPF unit 11 to be applied to the original image before enlargement is changed. G of FIG. 4 shows a case in which the characteristic of the first LPF unit 11 to be applied to the original image before geometric transformation is changed. H of FIG. 4 shows a case in which the characteristic of the first LPF unit 11 to be applied to the original image before transformation of a low transformation ratio is changed.

In FIG. 4, reference numeral 21 denotes an original image; 22, a reduced image; 23, an enlarged image; 24, a geometric-transformed image; 25, a micro-transformed image of a low transformation ratio; 26, a standard filter size; 27, a filter size smaller by a transformation ratio; and 28, a filter size larger by a transformation ratio. Note that the filter size is the range of reference pixels around a target pixel when performing filtering. In, for example, an averaging filter, a range of about 3×3 or 9×9 pixels in the vertical and horizontal directions is normally used. In this embodiment, a filter of a larger range can be used in accordance with the transformation ratio.

In the averaging filter or Gaussian filter, the filter size and the cutoff frequency have proportionality. Hence, when the filter sizes of the first LPF unit 11 and the second LPF unit 15 are changed in accordance with the transformation ratio in the first transformation unit 12 and the second transformation unit 13, the cutoff frequency can be made to match a spatial frequency changed by image transformation.

In A, B, C, and D of FIG. 4, the filter size of the first LPF unit 11 before transformation is constant. In A of FIG. 4, the filter size of the second LPF unit 15 to be applied to the reduced image 22 is set to the filter size 27 smaller by the transformation ratio. In B of FIG. 4, the filter size of the second LPF unit 15 to be applied to the enlarged image 23 is set to the filter size 28 larger by the transformation ratio. In C of FIG. 4, the filter size of the second LPF unit 15 to be applied to the geometric-transformed image 24 is set to the filter size 27 smaller than the standard in a region of the image where the transformation ratio is high and to the standard filter size 26 in a region where the transformation ratio is low. In D of FIG. 4, the filter size of the LPF to be applied to the image 25 of a low transformation ratio is set to the standard filter size 26. As described above, in these examples, the first transformation unit 12 and the second transformation unit 13 transform the target image at the same predetermined transformation ratio. The cutoff frequency of the second LPF unit 15 is obtained by multiplying the cutoff frequency of the first LPF unit 11 by the transformation ratio.

In E, F, G, and H of FIG. 4, the filter size of the second LPF unit 15 after transformation is constant. In E of FIG. 4, the filter size of the first LPF unit 11 to be applied to the original image 21 is set to the filter size 28 larger by the reciprocal of the transformation ratio of the reduced image 22. In F of FIG. 4, the filter size of the first LPF unit 11 to be applied to the original image 21 is set to the filter size 27 smaller by the reciprocal of the transformation ratio of the enlarged image 23. In G of FIG. 4, the filter size of the first LPF unit 11 to be applied to the original image 21 is changed by the reciprocal of the transformation ratio in each region of the geometric-transformed image 24. The filter size 28 larger than the standard by the reciprocal of the reduction ratio is set only in a region where the transformation ratio is high. In H of FIG. 4, the filter size of the first LPF unit 11 to be applied to the original image 21 is set to the standard filter size 26 in accordance with the micro-transformed image of a low transformation ratio. As described above, in these examples, the first transformation unit 12 and the second transformation unit 13 transform the target image at the same transformation ratio. The cutoff frequency of the first LPF unit 11 is obtained by dividing the cutoff frequency of the second LPF unit 15 by the transformation ratio.

As described above, either of the first LPF unit 11 and the second LPF unit 15 can have a variable filter size. Alternatively, both LPFs may have a variable filter size such that the cutoff frequencies before and after transformation match. However, it is more effective to change the filter size of the first LPF unit 11 before transformation because a moiré can be suppressed more effectively by making the cutoff frequency of the image after transformation close to SF/4.

(Filter Size)

The filter sizes of the LPFs will be described next in more detail. The filter size of the LPF, which is not changed according to the transformation ratio, can be the standard filter size described above. In an LPF, the larger the filter size is, the lower the cutoff frequency is, and the cutoff frequency and the sampling frequency have proportionality. The Nyquist frequency is SF/2 that is an image component having a period of two pixels. The standard filter is a filter having a cutoff frequency ½ the Nyquist frequency, that is, SF/4. In such a filter, frequency components having a period of two pixels are completely eliminated, and frequency components having a period of four pixels at maximum are left.

An averaging filter having a size of 2×2 calculates an average within the range of two pixels. Hence, the filter can process frequency components having a period of two pixels but cannot process frequency components having a period of four pixels.

In this embodiment, a case in which the standard size of the averaging filter is set to 2×2 will be described. As the cutoff frequency of the LPF having the standard size is separated from ¼ the sampling frequency, the possibility that a moiré remains arises. Hence, the cutoff frequency is a frequency having a value between ⅛ and 7/16 the sampling frequency (SF). In this case, the standard filter size of the LPF is 1.25×1.25 to 5×5 in an averaging filter. A Gaussian filter performs averaging while adding a weight to the center and can therefore have a filter size of 3×3 that is about 1.5 times larger than the pixel range of the averaging filter. A cutoff frequency having a value between ⅛ and 7/16 the SF can be obtained between 2×2 and 7×7. The filter size can be set within this range. The LPF that changes the filter size depending on the transformation ratio changes the size of the averaging filter in accordance with the transformation ratio.

The filter size that changes depending on the transformation ratio in correspondence with the standard filter size will be described in detail. For example, a case in which in B of FIG. 4, the enlargement ratio is 1.8, and the averaging filter of the first LPF unit 11 before enlargement has a size of 2×2 that is the median of the standard size will be explained. Since the size of the second LPF unit 15=the size of the first LPF unit 11×transformation ratio=2×1.8=3.6, the size of the averaging filter of the second LPF unit 15 after enlargement is set to 3×3.

In addition, for example, a case in which in E of FIG. 4, the reduction ratio is 0.7, and the averaging filter of the second LPF unit 15 after reduction has a size of 2×2 that is the median of the standard size will be explained. Since the size of the first LPF unit 11=the size of the second LPF unit 15/transformation ratio=2/0.7≈3, the size of the averaging filter of the first LPF unit 11 before reduction is set to 3×3. Even if no optimum value is obtained, degradation in the frequency distribution of the output image can be prevented as much as possible by setting a close value.

(Arrangement Examples of Filters)

Figure 5A:
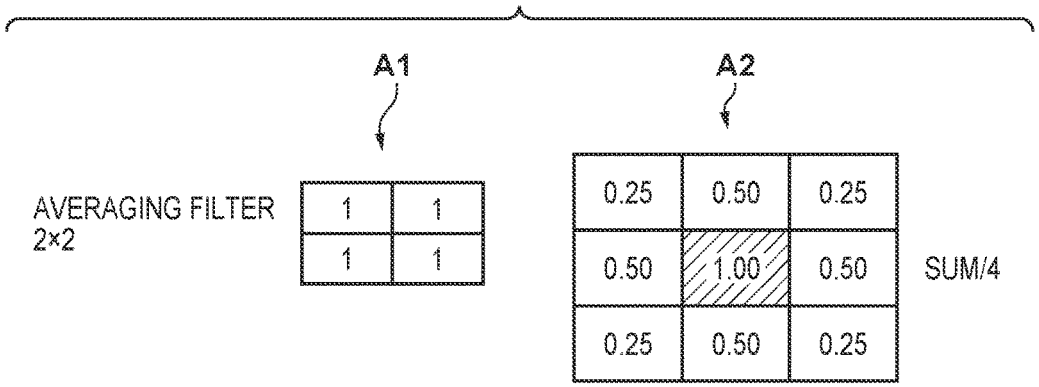
FIGS. 5A, 5B, and 5C are views showing examples in which an LPF is implemented by an averaging filter.
Figure 5B:
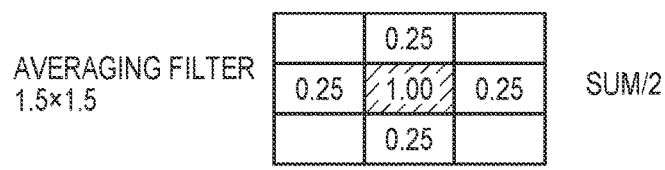
Figure 5C:
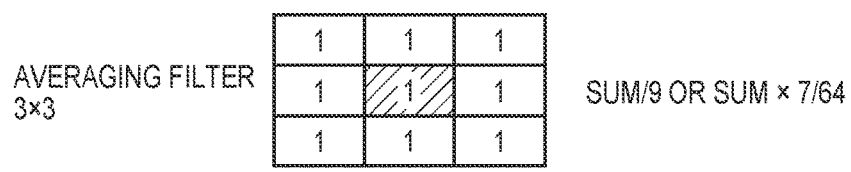

Detailed examples of LPFs or HPFs of the respective sizes will be described below with reference to FIGS. 5A to 7C. FIGS. 5A, 5B, and 5C are views showing arrangement examples of an LPF implemented by an averaging filter. Referring to FIGS. 5A, 5B, and 5C, the hatched cell at the center of the entire grid represents the target pixel, and numbers in the cells indicate magnifications for the target pixels and pixels located around it.

The LPF multiplies pixel values by the magnifications shown in FIGS. 5A, 5B, and 5C and divides the sum of the values by the sum of the magnifications, thereby obtaining an output. Alternatively, the LPF obtains an output by approximately performing multiplication and shift calculation in place of division.

FIG. 5A shows an averaging filter having a 2×2 size and its replacement with a 3×3 size. A filter A1 uses 2×2 coordinates. However, since the center of gravity of pixels shifts, an equivalent filter A2 represented by 3×3 with a shifted position of the center of gravity is used instead. The pixel value of each pixel is multiplied by a corresponding one of magnifications of 0.25 to 1 for pixels, and the sum of the products is divided by 4 that is the sum of the magnifications, thereby calculating the filtering output of the target pixel. As described above, the averaging filter of this size has a cutoff frequency close to SF/4 and therefore serves as an LPF of the standard size.

FIG. 5B shows an averaging filter having a 1.5×1.5 size, which is implemented by constants of 3×3 coordinates. The pixel value of each pixel is multiplied by a corresponding magnification of 1 for pixels, and the sum of the products is divided by 2 that is, the sum of the magnifications, thereby calculating the filtering output of the target pixel. The averaging filter of this size is an LPF having a size smaller than the standard size. The cutoff frequency becomes higher than SF/4.

FIG. 5C shows an averaging filter having a 3×3 size. The pixel value of each pixel is multiplied by a corresponding magnification of 1 for pixels, and the sum of the products is divided by 9 that is the sum of the magnifications (in the example of FIG. 5C, nine magnifications of 1 are set), thereby calculating the filtering output of the target pixel. When calculating an approximate value, the pixel value of the target pixel is multiplied by 7, and the product is divided by 64 (6 bits are dropped), thereby calculating the filtering output. The averaging filter of this size is an LPF having a size larger than the standard size. The cutoff frequency becomes lower than SF/4.

FIGS. 6A, 6B, and 6C are views showing arrangement examples of an LPF implemented by a Gaussian filter. FIG. 6A shows a Gaussian filter having a 3×3 size (a radius of 2). The pixel value of each pixel is multiplied by a corresponding one of magnifications for pixels, and the sum of the products is divided by 16 (4 bits are dropped), thereby calculating the filtering output of the target pixel. As described above, the Gaussian filter of this size has a cutoff frequency close to SF/4 and therefore serves as an LPF of the standard size.

FIG. 6B shows a Gaussian filter having a 3×3 size (a radius of 1.5). The pixel value of each pixel is multiplied by a corresponding one of magnifications for pixels, and the sum of the products is divided by 8 (3 bits are dropped), thereby calculating the filtering output of the target pixel. The Gaussian filter of this size has a cutoff frequency close to but slightly higher than SF/4 and is therefore used as an LPF of the standard size or a size smaller than the standard size.

FIG. 6C shows a Gaussian filter having a 5×5 size (a radius of 6). The pixel value of each pixel is multiplied by a corresponding one of magnifications for pixels, and the sum of the products is divided by 256 (8 bits are dropped), thereby calculating the filtering output of the target pixel. The Gaussian filter of this size has a cutoff frequency close to but slightly lower than SF/4 and is therefore used as an LPF of the standard size or a size larger than the standard size.

FIGS. 7A, 7B, and 7C are views showing arrangement examples of an HPF. When a dedicated HPF is provided to do calculation at once instead of using the combination of the second LPF unit 15 and the subtracter 16 in FIG. 3, an HPF to be described here is used.

FIG. 7A shows an HPF having a 3×3 size that replaces an HPF having a 2×2 size. The pixel value of each pixel is multiplied by a corresponding one of magnifications for pixels, and the sum of the products is divided by 3 that is the sum of positive or negative magnifications, thereby calculating the filtering output of the target pixel. When calculating an approximate value, the pixel value of the target pixel is multiplied by 85, and the product is divided by 256 (8 bits are dropped), thereby calculating the filtering output. As described above, the HPF of this size has a cutoff frequency close to SF/4 and therefore serves as an HPF of the standard size.

FIG. 7B shows an HPF having a 1.5×1.5 size, which is implemented by constants of a 3×3 size. The pixel value of each pixel is multiplied by a corresponding one of magnifications for pixels, and the sum of the products is calculated, thereby calculating the filtering output of the target pixel. The averaging filter of this size serves as an HPF of a size smaller than the standard size, and its cutoff frequency is higher than SF/4.

FIG. 7C shows an HPF having a 3×3 size. The pixel value of each pixel is multiplied by a corresponding one of magnifications for pixels, and the sum of the products is divided by 8 that is the sum of positive or negative magnifications (3 bits are dropped), thereby calculating the filtering output. The averaging filter of this size serves as an HPF of a size larger than the standard size, and its cutoff frequency is lower than SF/4.

As described above, in this embodiment, focus is placed on the principle of moiré occurrence. For low-frequency components of an input image, the image is transformed after passing through the LPF. For high-frequency components, the image is transformed and then passed through the HPF. After that, the two images are combined. As described above, the high-frequency components and the low-frequency components are separately processed, thereby suppressing a moiré caused by the interference between the sampling frequency and the high-frequency components upon image transformation and also suppressing a blur of the image by reflecting the high-frequency components on the output image.

In this embodiment, the component to obtain the high-frequency components after transformation may be a normal HPF or a combination of an LPF and a subtracter, as described above. That is, the present invention is not limited to the detailed arrangement of the embodiment, and can also be implemented by another arrangement within the spirit and scope of the present invention.

The image processing apparatus according to the above-described embodiment is applicable regardless of whether the tone values of the pixels of the input image and the output image are gamma tone values or linear tone values. However, because of the characteristic, the circuit scale or reaction to transformation processing changes between a case in which the tone value is represented by a gamma tone value and a case in which the tone value is represented by a linear tone value. That is, in a case in which the tone value is represented by a gamma tone value, the number of tone bits can be as small as 8 to 10, and the LPF or transformation processing circuit can be made small. In a case in which the tone value is represented by a linear tone value, the number of tone bits needs to be 12 to 16, and the processing circuit becomes large. On the other hand, interpolated values in transformation processing of linear processing are correct. However, in transformation processing of gamma processing, values obtained by linear interpolation or cubic interpolation are not correct, and a disturbance (noise) that is not a moiré but similar to a moiré may appear in the output image. In another embodiment, an arrangement will be described, in which a correct output image can be obtained using a relatively small processing circuit by combining the advantages of gamma processing and linear processing.

Figure 8:
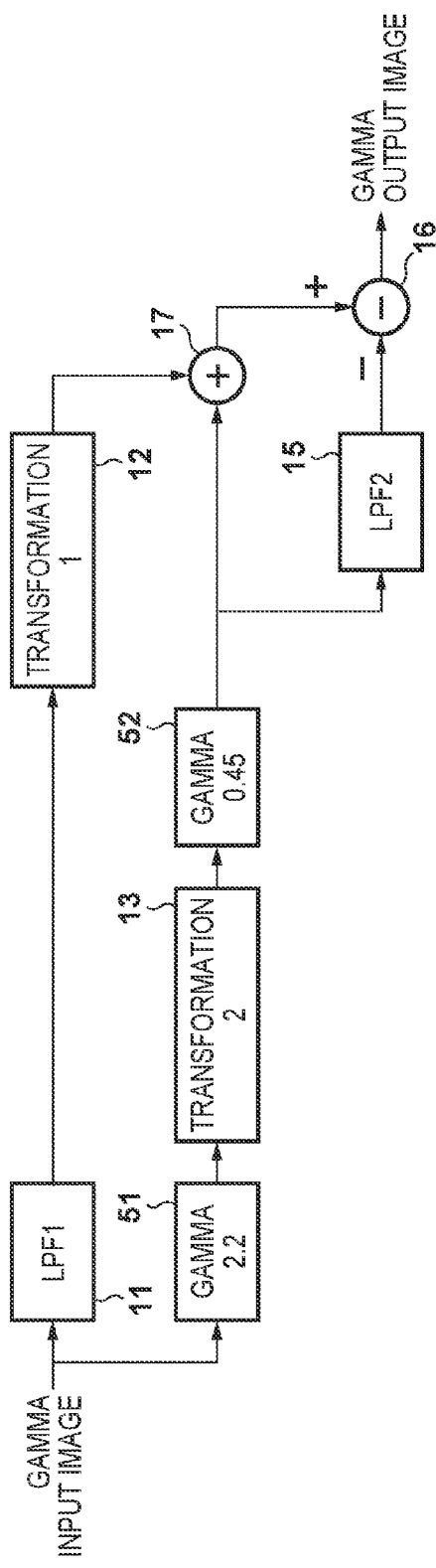
FIG. 8 is a block diagram showing the arrangement of an image processing apparatus.

FIG. 8 is a block diagram showing the arrangement of an image processing apparatus according to the second embodiment of the present invention. Constituent elements 11 to 17 shown in FIG. 8 are the same as those shown in FIG. 3, and a detailed description thereof will be omitted. A gamma 2.2 processing unit 51 converts a gamma tone value into a linear tone value. A gamma 0.45 processing unit 52 converts a linear tone value into a gamma tone value.

The gamma 2.2 processing unit 51 is a circuit that raises an input value to the power of 2.2. The gamma 0.45 processing unit 52 is a circuit that raises an input value to the power of 0.45. The gamma 2.2 processing unit 51 and the gamma 0.45 processing unit 52 can be formed by, for example, a lookup table. Alternatively, the gamma 2.2 processing unit 51 and the gamma 0.45 processing unit 52 can simply be formed using a multiplier and a square-root calculator, which raise an input value to the power of 2 or 0.45.

In this embodiment, assume a case in which a gamma tone value is input as an input image. The first LPF unit 11, the first transformation unit 12, the second LPF unit 15, the subtracter 16, and the adder 17 process the gamma tone value that remains intact. The second transformation unit 13 performs linear processing. The gamma 2.2 processing unit 51 converts the gamma input image into a linear image. The second transformation unit 13 performs transformation processing such as reduction, enlargement, or geometric transformation, thereby obtaining a second transformed image (linear image). The second transformed image (linear image) is converted into a gamma image by the gamma 0.45 processing unit 52 and then supplied to the second LPF unit 15 and the adder 17.

As described above, in this embodiment, when transforming high-frequency components of an input image, the input image input as a gamma tone value is converted into a linear tone value and then transformed. The transformed input image is converted into a gamma tone value and processed by the HPF. Hence, since only the second transformation unit 13 can be included in the circuit for performing linear processing, the number of processing circuits can be smaller than in a case in which all processing circuits are formed as linear processing circuits. In addition, the second transformed image is created using correct interpolated values, the high-frequency components of the image also have correct values, and a disturbance similar to a moiré does not occur.

Note that in this embodiment, the processing order of the subtracter 16 and the adder 17 is reverse to that in FIG. 3. With this order, calculation by the subtracter 16 is the final processing of this arrangement. Hence, the adder 17 need not calculate a negative value, and the processing circuit can be simple.

Figure 9:
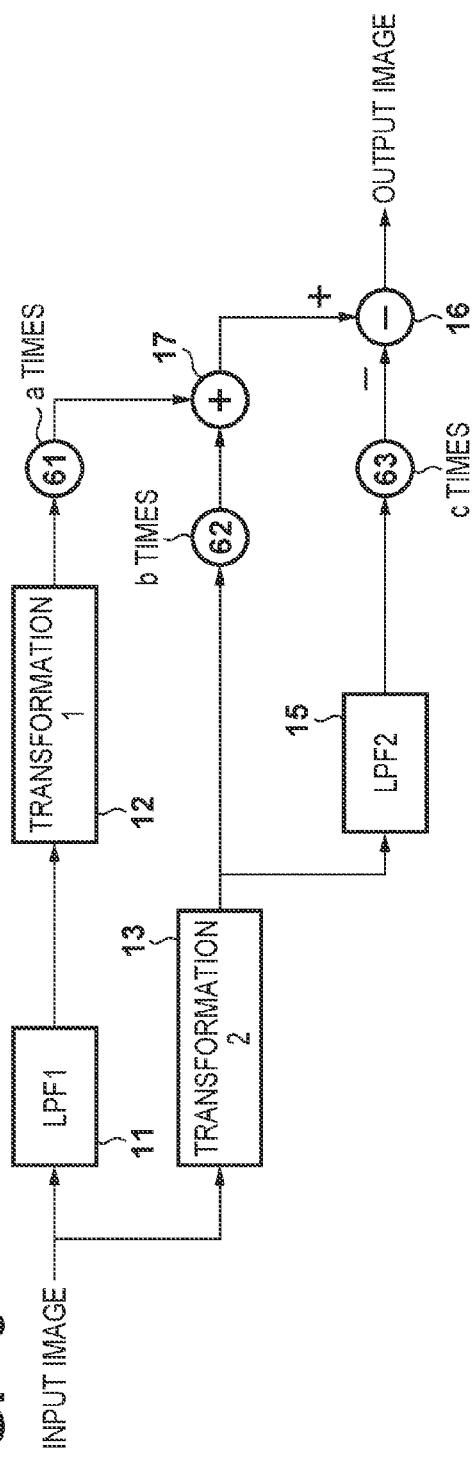
FIG. 9 is a block diagram showing an arrangement for combining transformed images at different ratios.

The arrangement of an image processing apparatus that adjusts the use ratio of a first transformed image and a second transformed image will be described next as still another embodiment of the present invention. FIG. 9 is a block diagram showing the arrangement of an image processing apparatus that combines transformed images while changing the ratio between them. Constituent elements 11 to 17 shown in FIG. 9 are the same as those shown in FIG. 3, and a detailed description thereof will be omitted. Reference numeral 61 denotes a multiplier for a first transformed image obtained by transforming low-frequency components; 62, a multiplier for a second transformed image; and 63, a multiplier for low-frequency components of the second transformed image.

The multipliers 61 to 63 can multiply an image by constants of different values. Let $\underline{a}$, b, and c be constants to be multiplied by the multipliers 61 to 63, respectively. In this embodiment, all the constants, $\underline{a}$, b, and c fall within the range of 0.5 to 2.0.

The first LPF unit 11 extracts only low-frequency components from the input image. Then, the first transformation unit 12 transforms the image into a first transformed image. The multiplier 61 multiplies the first transformed image by the constant $\underline{a}$. The multiplier 62 multiplies the input image (second transformed image) transformed by the second transformation unit 13 by the constant b. The multiplier 63 multiplies an image obtained by causing the second LPF unit 15 to extract only low-frequency components from the second transformed image transformed by the second transformation unit 13 by the constant c. The adder 17 adds the output of the multiplier 61 and the output of the multiplier 62. The subtracter 16 subtracts the output of the multiplier 63 from the sum, thereby obtaining an output image. Note that each of the multipliers 61 to 63 performs calculation of multiplying the tone value of the target image by the constant.

In this embodiment, since the ratio of three types of images can be changed halfway through image processing, various adjustments and effects can be applied to the output image. For example, when the second transformation unit 13 performs transformation processing such as enlargement or geometric transformation, generally, an image of short sharpness is often generated. When the constants are set to, for example, a=1.0 and b=c=1.2, the ratio of high-frequency components in the image can be increased relative to low-frequency components. Hence, a sharp transformed image can be obtained as the output image.

The processing according to this embodiment can also cope with a case in which a moiré slightly remains because, for example, the LPF has a moderate cutoff characteristic in the arrangement of the above-described embodiments. To enhance the effect of suppressing a moiré, the ratio of the low-frequency components of the image is raised after second transformation, and the first transformed image of the low-frequency components is made large accordingly. Then, the subtracter 16 largely subtracts components as the cause of a moiré. For example, when the constants of the multipliers are set to a=1.1, b=1.0, and c=1.1, such moiré suppression can be implemented.

Note that in the arrangement example of FIG. 9, the adder 17 adds the output of the multiplier 61 and the output of the multiplier 62, and the subtracter 16 subtracts the output of the multiplier 63 from the sum. However, the circuit arrangement is not limited to this. For example, as in the arrangement example of FIG. 3, the output of the multiplier 63 may be subtracted from the output of the multiplier 62 concerning the high-frequency components of the input image, and the output of the multiplier 61 concerning low-frequency components may be added to the subtraction result.

An embodiment executable when the input image is a still image or when the frame rate of the input image is equal to or lower than ½ a frame rate processable by the transformation processing circuit will be described next. FIG. 10 is a block diagram showing the arrangement of an image processing apparatus according to this embodiment in a case in which the input image is a still image or the frame rate is low.

Constituent elements 11 to 17 shown in FIG. 10 are the same as those shown in FIG. 3, and a detailed description thereof will be omitted. A first frame buffer 71 temporarily stores an input image, a second frame buffer 72 temporarily stores a transformed image, and a transformation unit 73 performs enlargement, reduction, geometric transformation, or the like.

The operation of the image processing apparatus having the above-described arrangement will be described. An input image is input to the first LPF unit 11 and also temporarily stored/held in the first frame buffer 71. The output of the first LPF unit 11 is transformed into a first transformed image by the transformation unit 73 and temporarily stored/held in the second frame buffer 72.

After this operation, the input image is read out from the first frame buffer 71 and input to the transformation unit 73. The second transformed image transformed by the transformation unit 73 is input to the adder 17 and the second LPF unit 15. The first transformed image is read out from the second frame buffer and added to the second transformed image by the adder 17. The subtracter 16 subtracts the output of the second LPF unit 15 from the output of the adder 17, thereby obtaining an output image.

In this embodiment, since only one transformation unit having a large circuit scale suffices, the circuit scale can be reduced.

In the above-described embodiments, an example in which the constituent elements of the image processing apparatus are constructed by hardware has been explained. However, the same processing as described above can be performed using a general-purpose information processing apparatus. In this embodiment, a case in which image processing such as transformation is performed by an arrangement using a microprocessor and the like will be described as an arrangement example using a general-purpose information processing apparatus with reference to FIGS. 11 and 12.

FIG. 11 is a block diagram showing an arrangement according to the embodiment using a microprocessor. In FIG. 11, reference numeral 81 denotes a microprocessor (MPU) that performs calculation and control; 82, an input interface; and 83, an output interface. Reference numeral 84 denotes a ROM (Read Only Memory) that stores a computer program; 85, a RAM (Writable Memory) used as a working memory; and 86, a storage that temporarily stores an image. Note that if the RAM 85 is so large as to store a plurality of images, the storage 86 need not always exist. As the general-purpose information processing apparatus having the arrangement shown in FIG. 11, an apparatus such as an embedded apparatus, a personal computer (PC), a tablet terminal, a smartphone, or a cloud server can be used.

Figure 12:
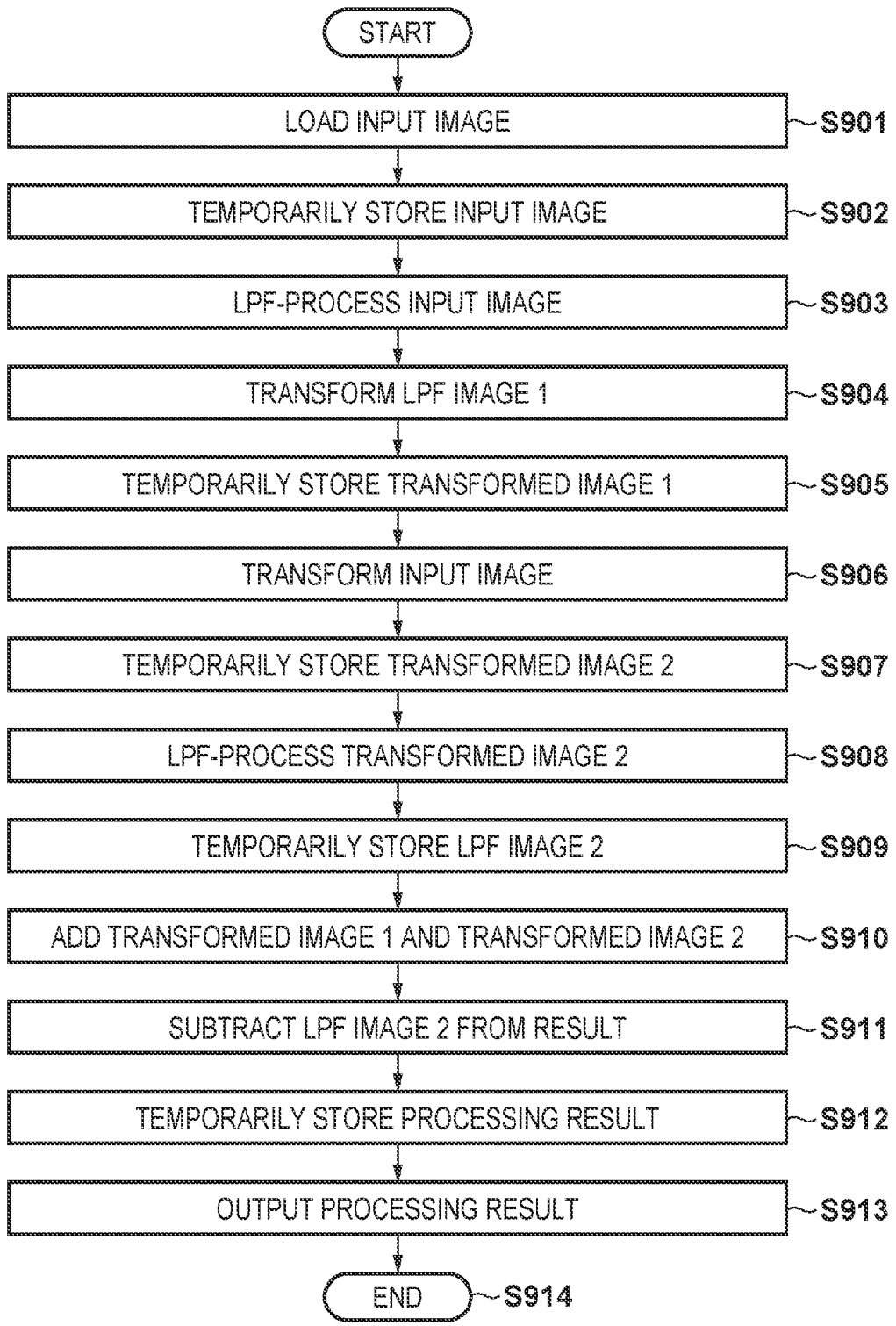
FIG. 12 is a flowchart showing the processing procedure of the image processing apparatus.

FIG. 12 is a flowchart showing processing performed by the microprocessor according to the embodiment. In the arrangement of FIG. 11, the microprocessor 81 executes the process of each step shown in the flowchart of FIG. 12 in accordance with the computer program written in the ROM 84, the storage 86, or the like. The processing will be described below on a step basis.

In step S901, an input image is loaded from the input interface 82 to the RAM 85. In step S902, the loaded input image is temporarily stored in the storage 86 as well. In step S903, LPF processing is performed for the input image on the RAM 85, and the image is temporarily stored on the RAM 85 as LPF image 1. This LPF processing is the same as the processing of the first LPF unit 11 described with reference to FIG. 3.

In step S904, transformation processing such as enlargement, reduction, or geometric transformation is performed for LPF image 1 to obtain a first transformed image. In step S905, the first transformed image is temporarily stored in the storage 86. In step S906, the input image is read out from the storage 86, transformation processing such as enlargement, reduction, or geometric transformation is performed to obtain a second transformed image, and the second transformed image is temporarily stored on the RAM 85. In step S907, the second transformed image is temporarily stored in the storage 86.

In step S908, LPF processing is performed for the second transformed image on the RAM 85 to obtain LPF image 2. This LPF processing is the same as the processing of the second LPF unit 15 described in the above embodiments. In step S909, LPF image 2 is temporarily stored in the storage 86.

In step S910, the first transformed image and the second transformed image are read out from the storage 86 and added to obtain an added image. In step S911, LPF image 2 read out from the storage 86 is subtracted from the added image to obtain a processing result. In step S912, the processing result is temporarily stored. In step S913, the temporarily stored processing result is output via the output interface 83 as an output image.

A process of causing the microprocessor to perform, by the above operation, the same processing as in the embodiment described with reference to FIG. 3 has been described. It is self-evident that the processing of the image processing apparatus shown in FIG. 8 or 9 can also be performed using a microprocessor, and a description thereof will be omitted. As in this embodiment, when a general-purpose information processing apparatus performs the same operation as the image processing apparatuses according to the above-described embodiments, it is possible to perform image processing while suppressing both a moiré and a blur.

As another example of enlargement, reduction, or geometric transformation of an image in the above embodiment, thinning processing of a color difference component in luminance/color difference signals may be performed.

In general, 4:2:2 signals obtained by thinning the color difference signals in the horizontal direction out of 4:4:4 signals that are luminance/color difference signals Y, Pb, and Pr with the same pixel count ratio or 4:2:0 signals obtained by thinning ½ the color difference signals in the horizontal and vertical directions to ¼ are created. The thinning processing performed at this time is reduction processing using an LPF and can therefore be applied to the operation according to the embodiment. When applying the processing, the above-described image processing is not performed for the luminance signal Y out of the 4:4:4 signals. The above-described image processing is performed for the color difference signals Pb and Pr, and after that, their coordinate positions are aligned with that of the luminance signal Y that remains intact. This can obtain 4:2:2 signals or 4:2:0 signals in which both a moiré and a blur are suppressed in the color difference signals.

In the above embodiments, a case in which enlargement, reduction, or geometric transformation of an image is performed has mainly be described. In yet another embodiment of the present invention, processing of reducing or enlarging an image in accordance with the number of screen lines when creating an AM screen (halftone dots) in screen printing will be described.

Figure 13A:
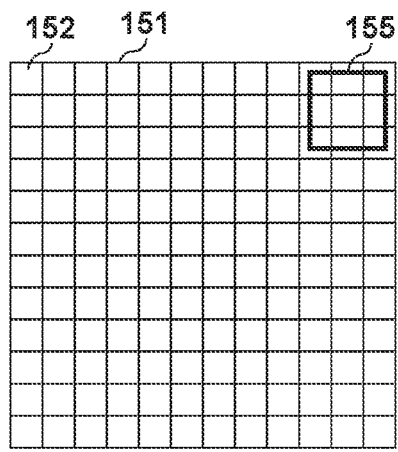
FIGS. 13A and 13B are views for explaining AM screen processing.
Figure 13B:
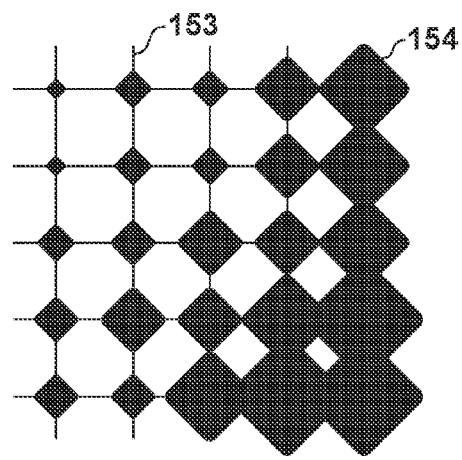

FIGS. 13A and 13B are views for explaining AM screen processing. FIG. 13A shows an input image, and FIG. 13B shows a screen image.

In FIGS. 13A and 13B, reference numeral 151 denotes part of an input image; 152, one pixel of the input image; 153, a screen line in an AM screen; 154, an ink amount at one intersection on the screen line; and 155, a pixel range to decide the ink amount.

AM (Amplitude Modulated) screen processing is processing of calculating the ink amount 154 to be printed for each intersection on the screen line 153. FIGS. 13A and 13B illustrate processing of converting 12×12 pixels of an input image to 5×5 screen lines of a screen image. This is reduction transformation calculation processing of converting the resolution of the input image 151 into the resolution of the screen lines 153. Note that the screen lines 153 are generally arranged obliquely for each color of ink. In this case, geometric transformation processing is performed in addition to reduction processing as the screen processing.

Figure 14:
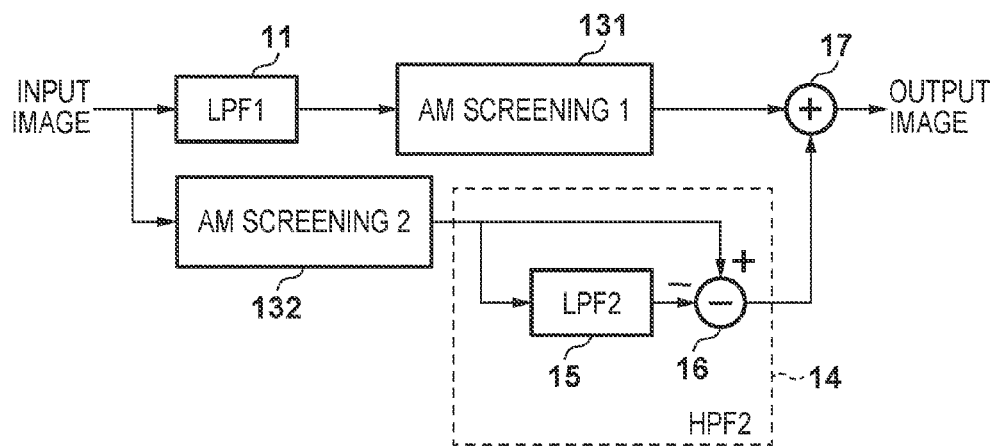
FIG. 14 is a block diagram showing the arrangement of an image processing apparatus that performs AM screen processing.

FIG. 14 is a block diagram showing the arrangement of an image processing apparatus according to this embodiment. Constituent elements 11 and 14 to 17 shown in FIG. 14 are the same as those shown in FIG. 3 described in the above embodiment, and a detailed description thereof will be omitted. A first AM screen processing unit 131 creates the AM screen image of a low-frequency image, and a second AM screen processing unit 132 creates the AM screen image of an input image.

The first LPF unit 11 extracts only low-frequency components from the input image. Next, the first AM screen processing unit 131 generates an AM screen according to a desired number of lines, thereby creating a first AM screen image.

The input image is also input to the second AM screen processing unit 132, and a second AM screen image having a desired number of lines is obtained. The second AM screen image is input to the second LPF unit 15 and the positive side of the subtracter 16. The second LPF unit 15 extracts the low-frequency components of the second AM screen image and inputs them to the negative side of the subtracter 16. The subtracter 16 subtracts the low-frequency components from the second AM screen image, thereby obtaining only the high-frequency components of the second AM screen image.

When the first AM screen image including only the low-frequency components and the high-frequency components of the second AM screen image, which are obtained in the above-described way, are combined by the adder 17, an output image that is an AM screen image including all frequency components is obtained. As described above, in this embodiment, low-frequency components of an input image undergo AM screen processing after passing through the LPF. High-frequency components undergo AM screen processing and then pass through the HPF. After that, the two images are combined. As described above, when performing AM screen processing as well, the high-frequency components and the low-frequency components are separately processed, thereby suppressing a moiré and also suppressing a blur of the image, as in the above-described embodiment.

In the above embodiments, a case in which processing can cope with an arbitrary transformation ratio in enlargement or reduction transformation has been described. In still yet another embodiment of the present invention, a case in which the above-described method is applied to transformation processing using a very low transformation ratio, for example, registration correction processing of correcting a slight deviation of each element of a 3-chip projector will be explained.

Figure 15:
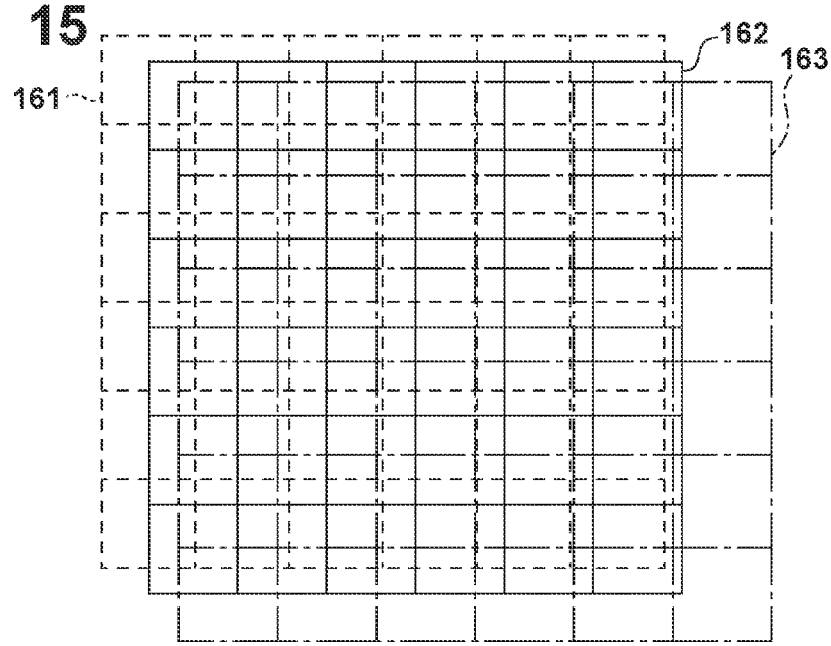
FIG. 15 is a view for explaining misregistration.

FIG. 15 is a view for explaining misregistration. In FIG. 15, reference numeral 161 denotes an R (red) projected image (radiation image) indicated by a dotted line; 162, a G (green) projected image 162 indicated by a solid line; and 163, a B (blue) projected image indicated by an alternate long and short dashed line.

In a 3-chip projector, lamp light is divided into RGB colors. The light of each color is modulated by an optical modulation element such as a liquid crystal or digital mirror device in accordance with the input image. The three colors after modulation are integrated by an optical system, and the integrated modulated light is projected onto a screen via a projection lens. At this time, if a slight deviation from the design value exists between the position of the modulation element and the optical system to integrate the light, the projected color light components do not exactly overlap and are instead projected with a shift. When the position of the modulation element and the optical system is finely adjusted, the shift amount of the projected images can normally be suppressed to one pixel or less. However, as shown in FIG. 15, the position of the R radiation image 161 or B radiation image 163 is projected with a shift amount equal to or less than one pixel with respect to the G radiation image 162. At this time, a disturbance called color misregistration occurs in the projected image. The color misregistration is a disturbance in which an R or B color is displayed on the edge of a monochrome line, and the color appears on the monochrome image.

To reduce the color misregistration disturbance, processing called registration correction is generally performed. Registration correction is processing of performing geometric transformation processing for R and B input images to make the R projected image 161 and the B projected image 163 match the G projected image 162. Note that even if the registration processing is performed, the projected pixels of the respective colors do not completely match, and a slight amount of color misregistration remains. However, the color misregistration can be reduced to a level unrecognizable by a viewer.

Figure 16:
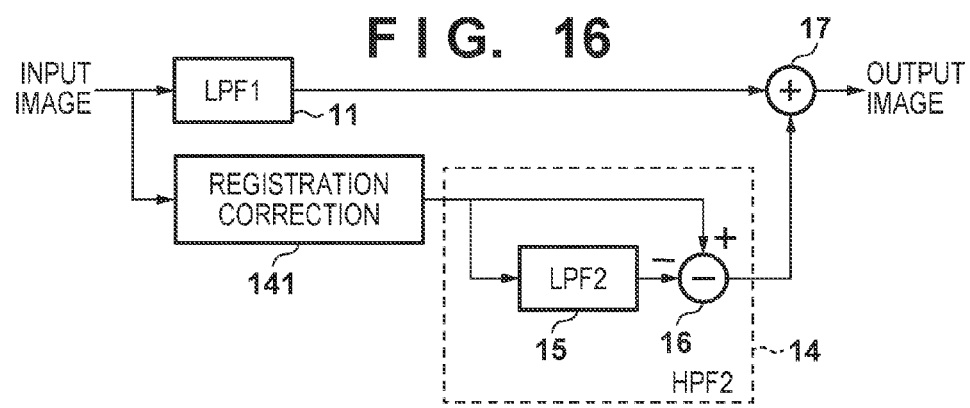
FIG. 16 is a block diagram showing the arrangement of an image processing apparatus that performs very small transformation.

FIG. 16 is a block diagram showing the arrangement of an image processing apparatus according to the seventh embodiment of the present invention. Constituent elements 11 and 14 to 17 shown in FIG. 16 are the same as those shown in FIG. 3 described in the above embodiment, and a detailed description thereof will be omitted. Even when performing registration correction for an image, the arrangement of the image processing apparatus can be modified as in the above-described embodiment. Reference numeral 141 denotes a registration correction processing unit 141 for an input image.

In this embodiment, the low-frequency component image obtained from the input image by the first LPF unit 11 does not undergo registration correction that is transformation processing. This is because transformation processing in the registration correction processing is performed for several pixels or less, and in most cases, for about one pixel, and therefore, the image changes little even when the registration correction is performed for the low-frequency image.

On the other hand, the input image is also input to the registration correction processing unit 141 and undergoes desired registration correction, and a registration-corrected image is obtained. The registration-corrected image is input to the second LPF unit 15 and the positive side of the subtracter 16. The second LPF unit 15 extracts the low-frequency components of the registration-corrected image and inputs them to the negative side of the subtracter 16. The subtracter 16 subtracts the low-frequency components from the registration-corrected image, thereby obtaining only the high-frequency components of the registration-corrected image.

When the image including only the low-frequency components and the high-frequency components of the registration-corrected image, which are obtained in the above-described way, are combined by the adder 17, an output image that is a registration-corrected image including all frequency components is obtained.

In this embodiment, moiré suppression and blur suppression can simultaneously be implemented, as in the above-described embodiment. In addition, since registration correction processing is performed only once, the processing circuit becomes compact. When using a program, high-speed processing can be performed.

In the above embodiments, an example in which a moiré caused by enlargement or reduction transformation processing or AM screen processing is prevented has mainly be described. In yet still another embodiment of the present invention, an embodiment for preventing a moiré and false colors caused by digital imaging processing in optical image capturing or reading using a digital image sensor will be described.

Figure 17:
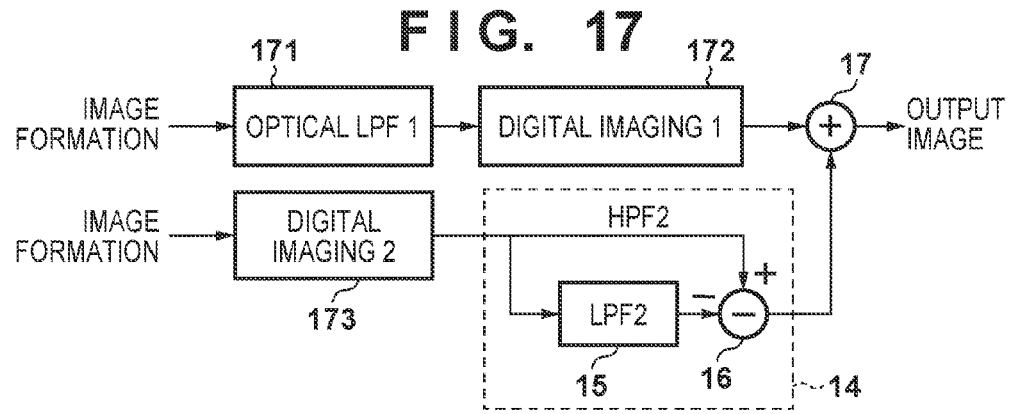
FIG. 17 is a block diagram showing the arrangement of an image processing apparatus.

FIG. 17 is a block diagram showing the arrangement of an image processing apparatus according to this embodiment. Constituent elements 14 to 17 shown in FIG. 17 are the same as those shown in FIG. 3 described in the above embodiment, and a detailed description thereof will be omitted. An optical LPF (optical low-pass filter) 171 is placed in front of the imaging plane and functions to optically blur an object image. A first digital imaging unit 172 such as an image sensor converts the object image blurred by the optical LPF unit 171 into a digital image. A second digital imaging unit 173 such as an image sensor converts the object image without a blur into a digital image.

The first optical LPF 171 extracts only low-frequency components (low-frequency region) from the optical input object image. The first digital imaging unit 172 converts the image into a first digital image. The cutoff frequency of the first optical LPF 171 is set to a value lower than the spatial frequency of the image sensor.

The optically input object image (including not only the low-frequency region but also a frequency region higher than the low-frequency region) is digitized by the second digital imaging unit 173 to a second digital image that is a digital image having a desired resolution.

The second digital image is input to the second LPF unit 15 and the positive side of the subtracter 16. The second LPF unit 15 extracts the low-frequency components of the second digital image and inputs them to the negative side of the subtracter 16. The subtracter 16 subtracts the low-frequency components from the second digital image, thereby obtaining only the high-frequency components of the second digital image.

When the first digital image including only the low-frequency components and the high-frequency components of the second digital image, which are obtained in the above-described way, are combined by the adder 17, an output image that is a digital image including all frequency components is obtained.

When the spatial cutoff frequency of the first optical LPF unit 171 and that of the second LPF unit 15 are set to close frequencies, a digital image including all frequencies can be obtained by combining. This is because if the cutoff frequencies of the two LPFs are shifted largely, the combined image may be blurred or too sharp. For example, one cutoff frequency can be set to have a value ½ or 2 times higher than the other cutoff frequency. In addition, the cutoff frequency of the first optical LPF unit 171 and that of the second LPF unit 15 can be set to, for example, ⅛ or more to ⁷⁄₁₆ or less of the sampling frequency of the image sensor that captures the object image.

As described above, in this embodiment, when converting an optical object image into a digital image, the high-frequency components and the low-frequency components are separately processed. That is, for low-frequency components, digital imaging is performed after the low-frequency components are extracted by the optical LPF. For high-frequency components, the high-frequency components are extracted after digital imaging is performed. It is therefore possible to simultaneously implement moiré suppression and blur suppression in digital imaging of an optical object image. The arrangement according to this embodiment can be used in any image capturing in which a moiré may occur, for example, still image capturing, moving image capturing, or document reading using a scanner.

Figure 18:
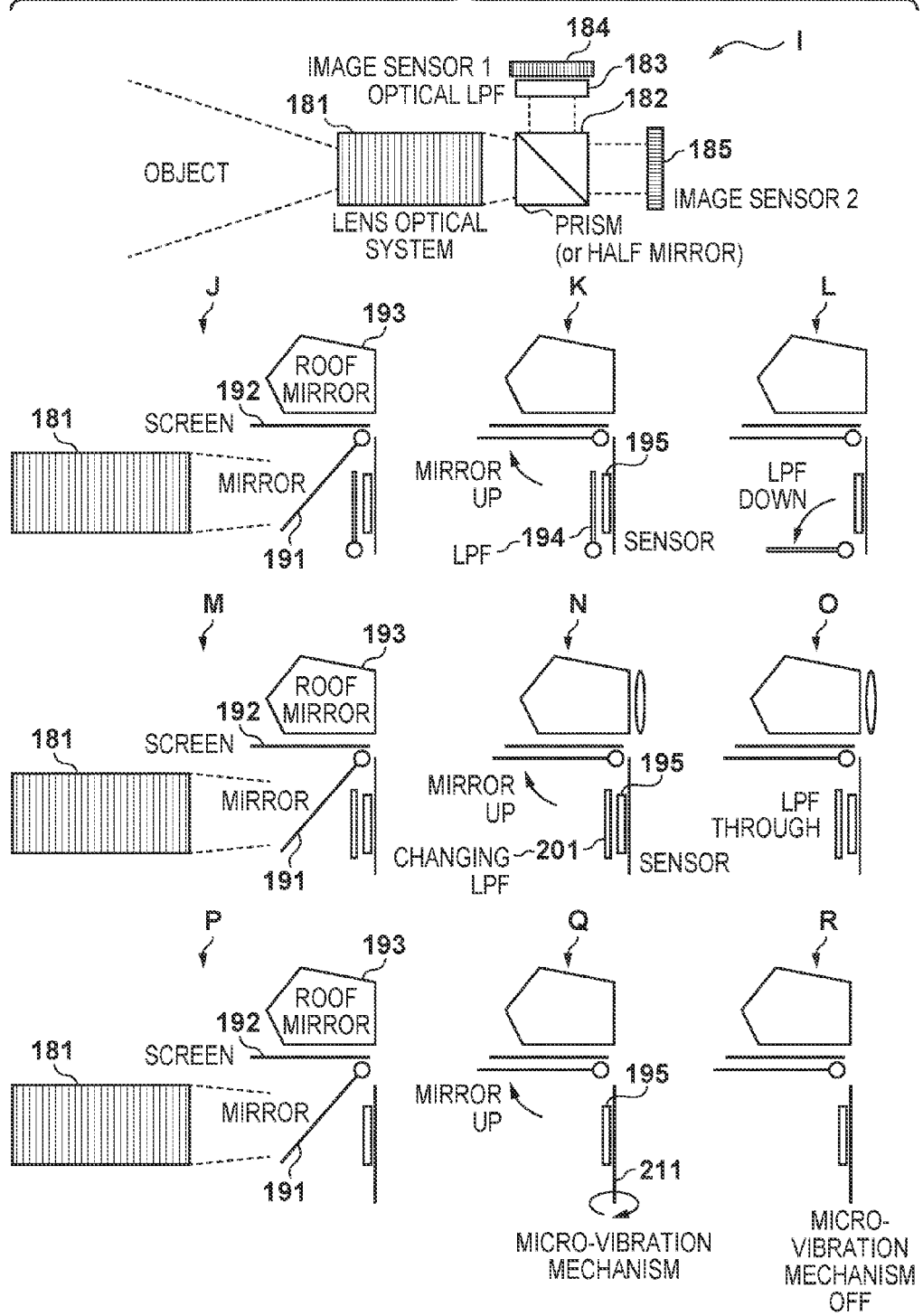
FIG. 18 is a view showing examples of an optical system.

A more detailed arrangement of the image processing apparatus according to this embodiment will be described next with reference to FIG. 18. FIG. 18 illustrates a plurality of examples of the optical system according to this embodiment. I of FIG. 18 shows the first example of the optical system. In I of FIG. 18, a lens optical system 181 is configured to form an image of an object. A prism or half mirror 182 divides the object image in two directions. An optical LPF 183 defocuses and blurs the object image. A first image sensor 184 converts the blurred object image into a digital image. A second image sensor 185 converts the high-resolution object image without a blur into a digital image. That is, the optical LPF 183, the first image sensor 184, and the second image sensor 185 shown in I of FIG. 18 correspond to the first optical LPF 171, the first digital imaging unit 172, and the second digital imaging unit 173 shown in FIG. 17, respectively.

As shown in I of FIG. 18, the lens optical system 181 forms the image of the object. The light that has passed through the lens optical system 181 is divided in two directions by the prism or half mirror 182 located at a position before the image formation position. The optical LPF 183 and the first image sensor 184 are placed on the first imaging plane, and the second image sensor 185 is placed on the second imaging plane.

By reading the values of the pixels of the image sensors, a blurred first digital image is obtained by the first image sensor 184, and a second digital image having a high resolution is obtained by the second image sensor 185. The rest of the arrangement is the same as that described with reference to FIG. 17.

J, K, and L of FIG. 18 are views showing the second example of the optical system according to this embodiment. J of FIG. 18 shows a state before the start of image capturing, K of FIG. 18 shows a state in which a blurred digital image is captured, and L of FIG. 18 shows a state in which a digital image having a high resolution is captured. In J, K, and L of FIG. 18, the lens optical system 181 is configured to form an image of an object, as in I of FIG. 18. A quick return mirror 191 switches the object image in two directions. A screen 192 visualizes the image formation. A roof mirror 193 is configured to erect the object image formed on the screen. An optically movable LPF 194 blurs the object image. An image sensor 195 converts the object image into a digital image.

The lens optical system 181 forms the image of the object. In the state before the start of image capturing shown in B of FIG. 18, the quick return mirror 191 forms the image of the object on the screen 192. The image of light formed on the screen 192 is converted into an erect image by the roof mirror 193 so that the user can view the image in the erecting state.

When the user presses a shutter button (not shown) to start image capturing, first, the quick return mirror moves upward to change to the state shown in K of FIG. 18 in which a blurred digital image is captured. In this state, since the movable optical LPF 194 is inserted, the blurred object image is formed on the image sensor 195. The image sensor 195 converts the blurred object image into a digital image.

Next, the movable optical LPF 194 is moved off the optical path, and the state changes to the state shown in L of FIG. 18 in which a digital image having a high resolution is captured. In this state, since the object image is directly formed on the image sensor 195 while keeping the high resolution, the image sensor 195 converts the object image with the high resolution into a digital image.

When the two digital imaging processes have ended, the movable optical LPF 194 and the quick return mirror are returned to the positions before the image capturing shown in J of FIG. 18, and the series of image capturing operations ends. As described above, digital imaging processing is performed twice with the movable optical LPF 194 located on the optical path and not, thereby obtaining the blurred first digital image and the second digital image by the one image sensor 195. The rest of the arrangement is the same as that described with reference to FIG. 17.

M, N, and O of FIG. 18 are views showing the third example of the optical system according to this embodiment. M of FIG. 18 shows a state before the start of image capturing, N of FIG. 18 shows a state in which a blurred digital image is captured, and O of FIG. 18 shows a state in which a digital image having a high resolution is captured. In M, N, and O of FIG. 18, the lens optical system 181 is the same as in I of FIG. 18, and the quick return mirror 191 to the roof mirror 193 and the image sensor 195 are the same as in J, K, and L of FIG. 18. A characteristic changing optical LPF 201 can electrically turn on/off the LPF characteristic.

The characteristic changing optical LPF 201 is an optical LPF capable of electrically turning on/off the LPF characteristic, as described above in Japanese Patent No. 2556831 or Japanese Patent Laid-Open No. 2003-50398. The characteristic changing optical LPF 201 according to this embodiment has such a characteristic that it functions as an optical LPF when no electrical signal is given, and directly passes incident light when an electrical signal is given. As described above, the characteristic changing optical LPF 201 can form as a low-pass filter by an electro-optical element.

The state shown in M of FIG. 18 before the start of image capturing is the same as in J of FIG. 18. When the user presses the shutter button, the state changes to the states shown in N and O of FIG. 18, like K and L of FIG. 18. In the state shown in N of FIG. 18 in which a blurred digital image is captured, no electrical signal is given to the characteristic changing optical LPF 201, whereby the characteristic changing optical LPF 201 blurs the object image and then forms the image on the image sensor 195.

In the state shown in O of FIG. 18 in which a digital image having a high resolution is captured, an electrical signal is given to the characteristic changing optical LPF 201, thereby forming an image with a high resolution on the image sensor 195 without blurring the object image.

As described above, digital imaging processing is performed twice while changing the characteristic of the characteristic changing optical LPF 201 on the optical path, thereby obtaining the blurred first digital image and the second digital image by the image sensor 195. The rest of the arrangement is the same as that described with reference to FIG. 17.

P, Q, and R of FIG. 18 are views showing the fourth example of the optical system according to this embodiment. P of FIG. 18 shows a state before the start of image capturing, Q of FIG. 18 shows a state in which a blurred digital image is captured, and R of FIG. 18 shows a state in which a digital image having a high resolution is captured. In P, Q, and R of FIG. 18, the lens optical system 181 is the same as in I of FIG. 18, and the quick return mirror 191 to the roof mirror 193 and the image sensor 195 are the same as in J, K, and L of FIG. 18. A mechanism 211 electrically micro-vibrates the image sensor 195.

The micro-vibration mechanism 211 is a mechanism that converts the electrical signal into a change in the position of the image sensor 195 using a piezoelectric device or magnet coil, thereby micro-vibrating the image sensor 195.

The state shown in P of FIG. 18 before the start of image capturing is the same as in J of FIG. 18. When the user presses the shutter button, the state changes to the states shown in Q and R of FIG. 18, like K and L of FIG. 18.

In the state shown in Q of FIG. 18 in which a blurred digital image is captured, the micro-vibration mechanism 211 is driven to micro-vibrate the image sensor 195, and in this state, the image sensor 195 converts the object image into a digital image. The digital image captured by the image sensor 195 that is being micro-vibrated is blurred even without passing through an optical LPF.

In the state shown in R of FIG. 18 in which a digital image having a high resolution is captured, the driving of the micro-vibration mechanism 211 is stopped to prohibit the image sensor from micro-vibrating. In this case, the object image is not blurred, and an image with a high resolution is formed on the image sensor 195.

As described above, digital imaging processing is performed twice with the image sensor 195 given the micro-vibration and not, thereby obtaining the blurred first digital image and the second digital image by the image sensor 195. The rest of the arrangement is the same as that described with reference to FIG. 17.

When the spatial cutoff frequency of the blur caused by the micro-vibration and that of the second LPF unit 15 are set to close frequencies, a digital image including all frequencies can be obtained by combining. To do this, it is important to analyze the image obtained with the micro-vibration and adjust the spatial cutoff frequency of the second LPF unit in advance.

Note that as the method of obtaining the first digital image with a blur and the second digital image with a high resolution, a method other than that described above may be used. For example, using an auto focus mechanism, the blurred first digital image may be captured in a state in which a slightly defocused image is formed, and the second digital image with a high resolution may be captured in a state in which an image in an in-focus state is formed.

With the above-described arrangement, the high-frequency components and the low-frequency components of an optical object image are separately processed, thereby simultaneously implementing moiré suppression and blur suppression in digital imaging. Note that an arrangement example assuming an optical arrangement in a single-lens reflex camera has mainly been described here. However, the present invention is not limited to this. For example, in a reading apparatus such as a scanner as well, the same effect as described above can be obtained by, for example, changing the position of the LPF or turning on/off its characteristic to obtain two types of digital images, that is, a digital image with a blur and a digital image having a high resolution and subsequently performing the same processing as described above.

In the second to fourth examples of the optical system according to this embodiment, one image sensor is used. Hence, the apparatus can be made compact, and the cost can be reduced, as compared to the first example in which two image sensors are used. However, if part of the object moves when digital imaging is being performed twice, a motion blur may occur in the moving object portion of the output image.

However, since the moving portion moves across a plurality of pixels in the image sensor, no interference with the pitch of the image sensor occurs, and neither moiré nor a false color occurs. When this characteristic feature is used, removal of a moiré and false colors and elimination of a motion blur can simultaneously be implemented by performing digital imaging twice.

As still yet another embodiment of the present invention, two examples, that is, the first example and the second example will be described concerning an arrangement for removing a moiré and false colors while coping with a moving object. FIGS. 19A and 19B show examples of the arrangement of an image processing apparatus according to this embodiment. FIG. 19A is a block diagram showing the arrangement of an image processing apparatus according to the first example. Constituent elements 14 to 17 shown in FIG. 19A are the same as those shown in FIG. 3, constituent elements 171 to 173 are the same as those shown in FIG. 17, and a detailed description thereof will be omitted.

A comparator 221 compares the pixels of blurred digital image 1 output from the first digital imaging unit 172 with the pixels of blurred digital image 2 output from the second LPF unit 15. A selector 222 switches pixels to be output as an output image in accordance with the determination of the comparator 221.

In this arrangement, an input object image is blurred by the optical LPF 171 and converted into a digital image. G component 1 of each pixel of thus obtained blurred digital image 1 is input to the comparator 221. In addition, the object image is directly converted into a digital image and then blurred by the second LPF unit 15. G component 2 of each pixel of thus obtained digital image 2 is input to the comparator 221. The comparator 221 compares G components 1 and 2.

The comparator 221 makes one of following determinations 1, 2, and 3 for the G components of the pixels of the tow digital images. Note that only the G components are used for the determination because the R and B components are readily affected by a false color.

| | |
|---|---|
| $G$ component $1 = G$ component $2$ | Determination 1 |
| $\|G$ component $1 - G$ component $2\| <$ threshold | Determination 2 |
| $\|G$ component $1 - G$ component $2\| >$ threshold | Determination 3 |

The comparator 221 thus calculates the absolute value of the difference between the pixel values, and compares the absolute value of the difference with a predetermined threshold.

Next, the selector 222 switches the pixels of the two digital images based on the determination. Pixel 1 of the first digital image is the same as the pixel of the output image in FIG. 17, that is, a pixel that has undergone the image processing. Second pixel 2 is a pixel obtained by directly converting the object image into a digital image.

In accordance with the result of determination 1, 2, or 3, the selector switches the pixels to be output in the following way. In determination 1, G components are identical, but R and B components may be different due to the influence of a false color. Hence, pixel 1 is output as a pixel of the output image. In determination 2, the pixel is determined as a pixel that is not moving, and pixel 1 is output as a pixel of the output image. In determination 3, the pixel is determined as a pixel that is moving, and pixel 2 is output as a pixel of the output image.

As the threshold, a different value can be used depending on whether to place focus on moiré removal or motion blur prevention. For example, when the threshold is set to 10% (=0.1), a moiré whose intensity is 10% or less can be removed, but a moiré that is intense more than 10% cannot be removed. On the other hand, a motion blur is not so noticeable because only a motion blur having a difference of 10% or less remains.

For example, when the threshold is set to 40% (=0.4), a moiré whose intensity is 40% or less can be removed. On the other hand, a motion blur is noticeable to some extent because even a motion blur having a difference of 40% remains. Hence, the threshold can be changed in accordance with the intensity of a moiré that occurs.

FIG. 19B is a block diagram showing the arrangement of an image processing apparatus according to the second example. Constituent elements 14 to 17 shown in FIG. 19B are the same as those shown in FIG. 3, constituent elements 171 to 173 are the same as those shown in FIG. 17, and a detailed description thereof will be omitted.

A similarity calculator 231 calculates the similarity between G component 1 of each pixel of blurred digital image 1 and G component 2 of each pixel of blurred digital image 2. A combining processing unit 232 changes/controls the combining ratio of a pixel of blurred digital image 1 and a pixel of blurred digital image 2 in accordance with the similarity calculated by the similarity calculator 231.

For the similarity of images, various calculation methods are known, and any method is usable. For example, the difference between the average values of the peripheral pixels of calculation target pixels can be calculated as a similarity. An example in which the similarity is calculated based on the square of the difference between pixel values will be described here.

$$A = (G\text{ component }1 - G\text{ component }2)^2$$

Note that when the value of the G component is normalized such that the maximum value becomes 1.0, the value A ranges from 0 to 1.0.

The smaller the value A is, the higher the similarity is, and the lower the possibility that the target pixel is moving is. The combining processing unit 232 performs, for example, the following combining processing.

$$S = \text{pixel }1 * (1 - A) + \text{pixel }2 * A$$

The higher the possibility that the target pixel is moving is, the larger the value A is. Hence, in a combined pixel S, the ratio of pixel 2 of blurred digital image 2 becomes high. Reversely, the lower the possibility that the target pixel is moving is, the smaller the value A is. Hence, the ratio of pixel 1 of blurred digital image 1 becomes high. In this way, the pixel of the result of calculation of first image+second image−third image and the calculation target pixel of the second image are combined by a product-sum operation.

The adder 17 adds the high-frequency components of digital image 2 output from the subtracter 16 to the combined pixel S, thereby obtaining each pixel of the output image. Eventually, in this arrangement, a pixel close to digital image 2 is used as a pixel of the output image, which is moving at a high possibility, and a pixel close to the sum of blurred digital image 1 and the high-frequency components of digital image 2 is used as a pixel which is moving at a low possibility. Hence, an output image in which both a moiré and a motion blur are appropriately suppressed can be obtained.

Still image capturing in image capturing has mainly been described above. However, when the processing is repetitively performed at a high speed in accordance with the frame rate, the arrangement can obviously be used to capture a moving image, and a description thereof will be omitted.

Figure 20:
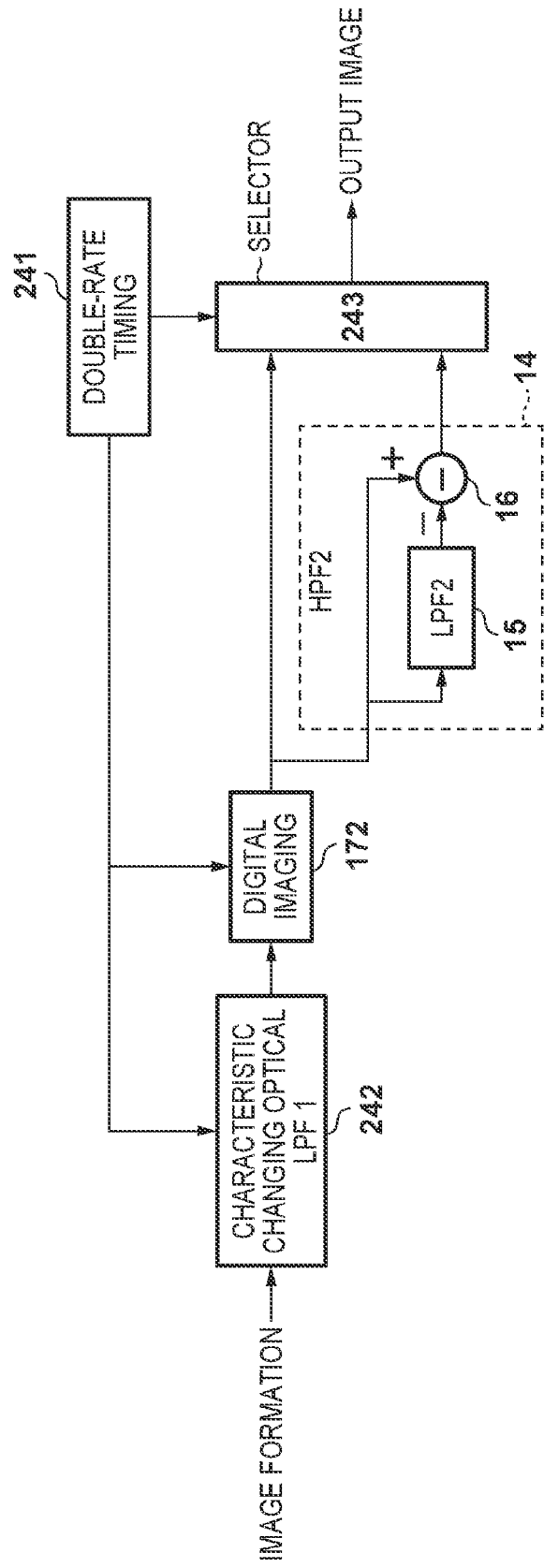
FIG. 20 is a block diagram showing the arrangement of an image processing apparatus.

As yet still another embodiment of the present invention, an arrangement for capturing a sharp moving image while removing a moiré will be described. FIG. 20 is a block diagram showing the arrangement of an image processing apparatus according to this embodiment. Constituent elements 15 and 16 shown in FIG. 20 are the same as those shown in FIG. 14, a constituent element 172 is the same as that shown in FIG. 17, and a description thereof will be omitted.

A generator 241 generates a timing signal at a rate twice as high as the frame rate of moving image capturing. A characteristic changing optical LPF 242 electrically turns on/off an LPF. A selector 243 switches between blurred digital image 1 and high-frequency components of digital image 2.

In this arrangement, for example, if the frame rate of moving image capturing is 60 P (sec per frame), the double-rate timing generator 241 generates a timing signal at 120 P that is twice higher than the frame rate. At this double rate, the characteristic changing optical LPF 1 periodically repetitively turns on/off the LPF characteristic. Then, the first digital imaging unit 172 periodically outputs blurred digital image 1 and digital image 2 having a high resolution. An HPF unit 14 extracts high-frequency components from the output.

The selector 243 that performs switching at the double-rate timing switches between blurred digital image 1 and the high-frequency components of the digital image having a high resolution, and outputs an output image (moving image). Hence, an output image (image 1) including neither a moiré nor a false color and a high-frequency component image (image 2) that exists only in ½ of 120 P are alternately output. Hence, a sharp moving image can be output while suppressing a moiré and false colors as a whole.

As still yet another embodiment of the present invention, an arrangement adapted to image processing software for removing a moiré and false colors will be described using the first example and the second example.

Figure 21A:
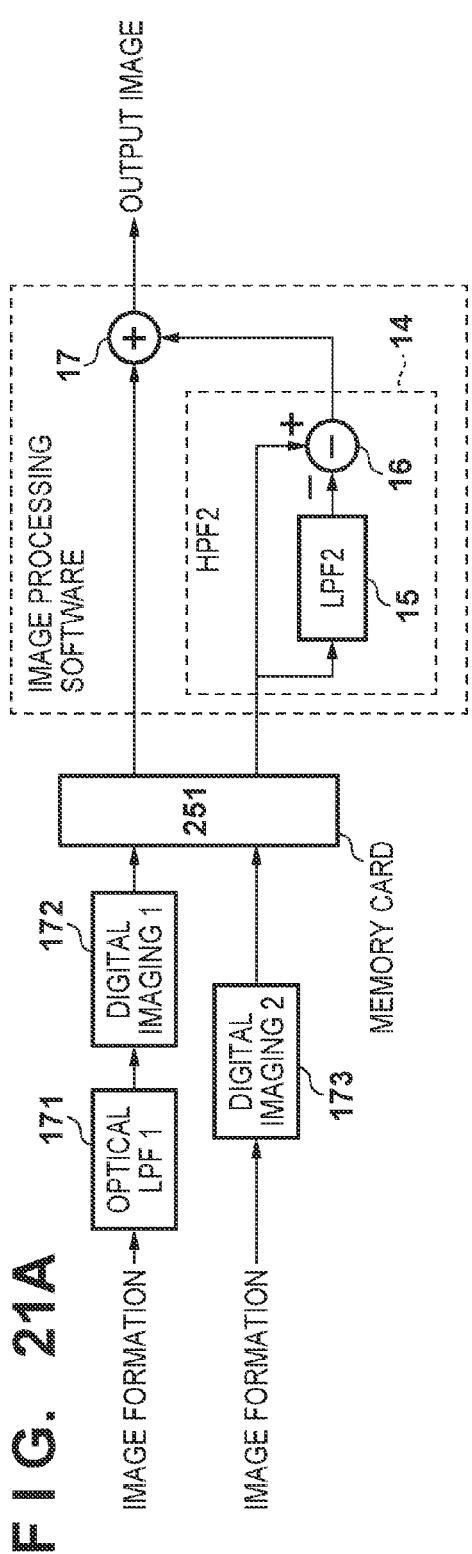
FIGS. 21A and 21B are block diagrams each showing the arrangement of an image processing apparatus.
Figure 21B:
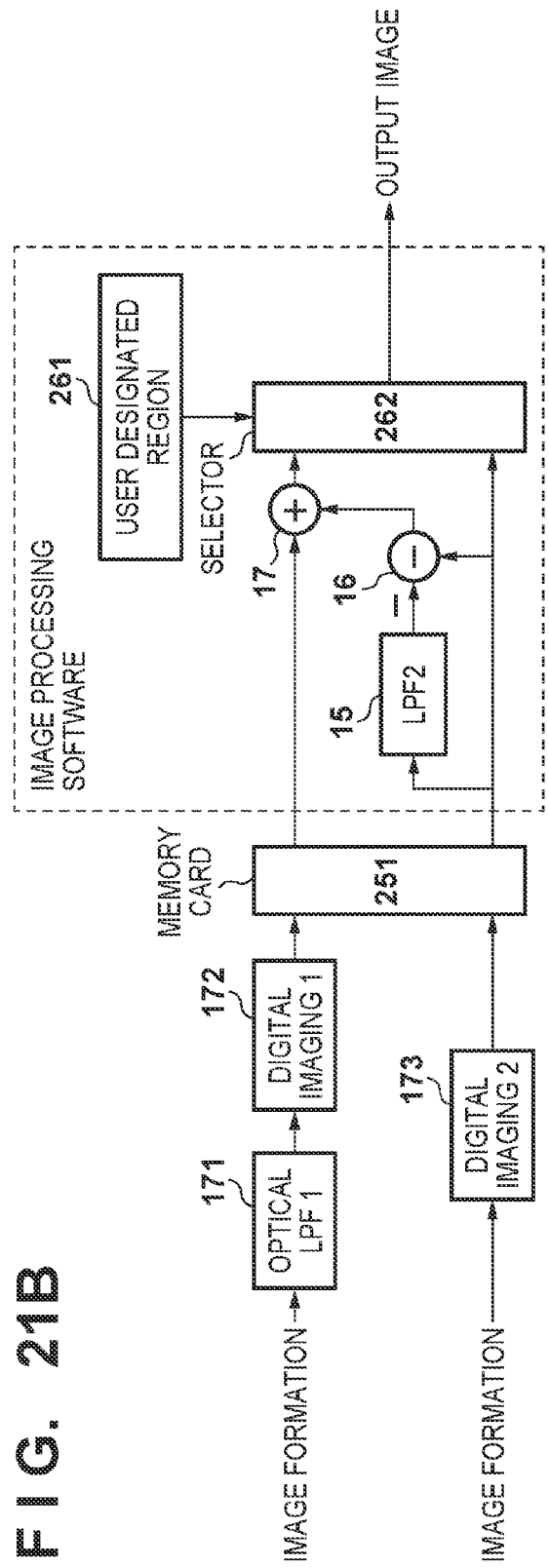

FIGS. 21A and 21B show examples of the arrangement of an image processing apparatus according to this embodiment. FIG. 21A is a block diagram showing the arrangement of an image processing apparatus according to the first example.

Constituent elements 14 to 17 shown in FIG. 21A are the same as those shown in FIG. 14, constituent elements 171 to 173 are the same as those shown in FIG. 17, and a description thereof will be omitted. A memory card 251 records an image.

In this embodiment, both digital image 1 obtained by blurring an object image by the optical LPF 171 and then performing digital imaging and digital image 2 having a high resolution obtained by directly converting the object image into a digital image are stored in the memory card 251.

The image processing software reads out digital image 2 having a high resolution from the memory card 251, and causes the LPF unit 15 and the subtracter 16 to extract high-frequency components. In addition, blurred digital image 1 is read out and added to digital image 2, thereby obtaining an output image.

In this embodiment, two images are captured, and only when a moiré has occurred, an image from which the moiré is removed by image processing software can be obtained. If no moiré occurs, the digital image having a high resolution can directly be used.

FIG. 21B is a block diagram showing the arrangement of an image processing apparatus according to the second example of the embodiment. Constituent elements 15 to 17 shown in FIG. 21B are the same as those shown in FIG. 14, constituent elements 171 to 173 are the same as those shown in FIG. 17, a constituent element 251 is the same as that shown in FIG. 21A, and a description thereof will be omitted. Reference numeral 261 denotes a moiré region designated by a user; and 262, a selector.

In this embodiment, only for the region 261 designated by the user on the image processing software, the selector 262 selects pixels that have undergone the image processing as pixels to be output as an output image. As for the remaining pixels, pixels of digital image 2 having a high resolution are selected as output pixels. In this way, the processing is performed only for a portion including a moiré. Hence, a high-quality output image including no moiré as a whole and including the original image having a high resolution at a high ratio can be obtained.

The image processing according to the above-described embodiment can be applied in any image capturing in which a moiré may occur, for example, still image capturing, moving image capturing, or document reading using a scanner.

Examples of arrangements for implementing the present invention have been described above using the embodiments. However, the arrangements for implementing the spirit and scope of the present invention are not limited to the above-described embodiments, as a matter of course. The above-described embodiments can widely be used in an apparatus or program for performing transformation processing such as enlargement, reduction, or geometric transformation by a digital operation. For example, the embodiments can be used for resolution conversion in a function of converting an input resolution in accordance with the resolution of a display panel or a picture-in-picture function in a TV set. The embodiments can also be used for a keystone or curve transformation function in a projector, a resolution conversion function in a digital camera, a resolution conversion or image rotation function in an image processing application. The embodiments can also widely be used for image resolution conversion processing in the printer driver or main body of a printer. According to the arrangements of the above-described embodiments, regardless of whether an object image is an image before photoelectric conversion or a captured image acquired by photoelectrically converting an object image, different processes are executed for low-frequency components and high-frequency components of the image, thereby reducing both a moiré and a blur.

According to the present invention, it is possible to reduce a moiré and a blur caused by transformation processing for an input image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)[7]), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-007192, filed on Jan. 16, 2015, and Japanese Patent Application No. 2015-164180, filed on Aug. 21, 2015, which are hereby incorporated by reference herein in their entirety.

What is claimed is:

1. An image processing apparatus comprising:
one or more processors; and
a memory for storing instructions to be executed by the one or more processors, wherein, when the instructions stored in the memory are executed by the one or more processors, the image processing apparatus functions as:
an input unit adapted to input an image;
a first acquisition unit adapted to acquire a low-frequency component image from the image input by the input unit;
a first transformation unit adapted to transform the low-frequency component image acquired by the first acquisition unit;
a second transformation unit adapted to transform the image input by the input unit;
a second acquisition unit adapted to acquire a transformed high-frequency component image from the transformed image obtained by the second transformation unit; and a display control unit adapted to display, on a display unit, a combined image obtained by combining the transformed low-frequency component image obtained by the first transformation unit and the transformed high-frequency component image acquired by the second acquisition unit, wherein an image transformation performed by the first transformation unit and the second transformation unit includes at least one of enlargement, reduction, or geometric transformation of the image.

2. The apparatus according to claim 1, wherein the second acquisition unit comprises:

a third acquisition unit adapted to acquire a low-frequency component image from the transformed image obtained by the second transformation unit; and a subtraction unit adapted to subtract the low-frequency component image of the transformed image from the transformed image to generate the transformed high-frequency component image.

3. The apparatus according to claim 2, wherein, when the instructions stored in the memory are executed by the one or more processors, the image processing apparatus further functions as:

a first multiplication unit adapted to multiply the transformed low-frequency component image obtained by the first transformation unit by a first constant;

a second multiplication unit adapted to multiply the transformed image obtained by the second transformation unit by a second constant; and a third multiplication unit adapted to multiply the low-frequency component image acquired by the third acquisition unit by a third constant, wherein the subtraction unit subtracts the low-frequency component image multiplied by the third constant from the transformed image multiplied by the second constant to generate the transformed high-frequency component image, and the display control unit displays an image obtained by adding the transformed low-frequency component image multiplied by the first constant and the transformed high-frequency component image generated by the subtraction unit on the display unit as the combined image.

4. The apparatus according to claim 1, wherein:

the first acquisition unit acquires an image of a low-frequency component lower than a first cutoff frequency from the input image as the low-frequency component image, the second acquisition unit acquires an image of a high-frequency component higher than a second cutoff frequency from the transformed image as the transformed high-frequency component image, and each of the first cutoff frequency and the second cutoff frequency is a frequency having a value between 1/8 and 7/16 a sampling frequency of the image input by the input unit.

5. The apparatus according to claim 4, wherein each of the first cutoff frequency and the second cutoff frequency is a frequency 1/4 the sampling frequency of the image input by the input unit.

6. The apparatus according to claim 1, wherein:

each of the first transformation unit and the second transformation unit transforms a target image at a predetermined transformation ratio, the first acquisition unit acquires an image of a low-frequency component lower than a first cutoff frequency from the input image as the low-frequency component image, the second acquisition unit acquires an image of a high-frequency component higher than a second cutoff frequency from the transformed image as the transformed high-frequency component image, and the first cutoff frequency is obtained by multiplying the second cutoff frequency by the transformation ratio.

7. The apparatus according to claim 1, wherein:

each of the first transformation unit and the second transformation unit transforms a target image at a predetermined transformation ratio, the first acquisition unit acquires an image of a low-frequency component lower than a first cutoff frequency from the input image as the low-frequency component image, the second acquisition unit acquires an image of a high-frequency component higher than a second cutoff frequency from the transformed image as the transformed high-frequency component image, and the second cutoff frequency is obtained by dividing the first cutoff frequency by the transformation ratio.

8. The apparatus according to claim 1, wherein:

the image input by the input unit is represented as a gamma tone value, and each of the first transformation unit and the second transformation unit comprises:

a unit adapted to convert the image represented as the gamma tone value into a linear tone value;

a unit adapted to transform the image represented as the linear tone value; and a unit adapted to convert the transformed image into a gamma tone value.

9. An image processing method of an image processing apparatus, comprising:

causing an input unit to input an image;

causing a first acquisition unit to acquire a low-frequency component image from the image input by the input unit;

causing a first transformation unit to transform the low-frequency component image acquired by the first acquisition unit;

causing a second transformation unit to transform the image input by the input unit;

causing a second acquisition unit to acquire a transformed high-frequency component image from the transformed image obtained by the second transformation unit; and causing a display control unit to display, on a display unit, a combined image obtained by combining the transformed low-frequency component image obtained by the first transformation unit and the transformed high-frequency component image acquired by the second acquisition unit, wherein an image transformation performed by the first transformation unit and the second transformation unit includes at least one of enlargement, reduction, or geometric transformation of the image.

10. A non-transitory computer-readable storage medium storing a computer program for causing a computer to function as each unit of an image processing apparatus comprising:

an input unit adapted to input an image;

a first acquisition unit adapted to acquire a low-frequency component image from the image input by the input unit;

a first transformation unit adapted to transform the low-frequency component image acquired by the first acquisition unit;

a second transformation unit adapted to transform the image input by the input unit;

a second acquisition unit adapted to acquire a transformed high-frequency component image from the transformed image obtained by the second transformation unit; and a display control unit adapted to display, on a display unit, a combined image obtained by combining the transformed low-frequency component image obtained by the first transformation unit and the transformed high-frequency component image acquired by the second acquisition unit, wherein an image transformation performed by the first transformation unit and the second transformation unit includes at least one of enlargement, reduction, or geometric transformation of the image.

11. An image processing apparatus comprising:

an inputter for inputting an image;

a first acquirer for acquiring a low-frequency component image from the image input by the inputter;

a first transformer for transforming the low-frequency component image acquired by the first acquirer;

a second transformer for transforming the image input by the inputter;

a second acquirer for acquiring a transformed high-frequency component image from the transformed image obtained by the second transformer; and a display controller for displaying, on a display unit, a combined image obtained by combining the transformed low-frequency component image obtained by the first transformer and the transformed high-frequency component image acquired by the second acquirer, wherein an image transformation performed by the first transformer and the second transformer includes at least one of enlargement, reduction, or geometric transformation of the image.

\* \* \* \* \*